(12) United States Patent
Walker et al.

(10) Patent No.: US 6,970,837 B1
(45) Date of Patent: \*Nov. 29, 2005

(54) METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER

(75) Inventors: Jay S. Walker, Ridgefield, CT (US); Magdalena Mik, Greenwich, CT (US); Andrew S. Van Luchene, Norwalk, CT (US); Keith Bemer, New York, NY (US); John Shepardson, Skillman, NJ (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,930

(22) Filed: Oct. 5, 1999

Related U.S. Application Data

(63) Continuation-in-part of application No. 09/337,906, filed on Jun. 22, 1999, which is a continuation-in-part of application No. 09/190,744, filed on Nov. 12, 1998, now abandoned, and a continuation-in-part of application No. 09/083,345, filed on May 22, 1998, now abandoned, which is a continuation-in-part of application No. 08/889,503, filed on Jul. 8, 1997, now Pat. No. 6,249,772, which is a continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207.

(51) Int. Cl.$^7$ .............................................. G06F 17/60

(52) U.S. Cl. ............................. 705/26; 705/27; 705/14; 705/20; 705/39; 705/75

(58) Field of Search ................................... 705/26, 27

(56) References Cited

U.S. PATENT DOCUMENTS

| 3,691,527 A | 9/1972 | Yamamoto |
| 4,237,537 A | 12/1980 | Pitches et al. |
| 4,341,951 A | 7/1982 | Benton |

(Continued)

FOREIGN PATENT DOCUMENTS

| CA | 2070736 A1 | 6/1992 |
| CA | 2217739 A1 | 4/1996 |
| EP | 0 779 587 A3 | 9/1996 |

(Continued)

OTHER PUBLICATIONS

"Brother Industries is pushing ahead with its new PC software . . . ", IDC Japan Report, Aug. 30, 1991, Section: vol. 17, p. 53.

Maras, Elliot, "1995: downsizing adds costs; new strategies sought", Automatic Merchandiser, Aug. 1996, pp. 20–22, 24, 26, 28, 30, 32, 34, 36, 38, 40 and 44.

Naik, Gautam, "In Digital Dorm, Click on Return for Soda", The Wall Street Journal, Jan. 23, 1997, Section: Online, p. B1.

(Continued)

Primary Examiner—Mark Fadok
(74) Attorney, Agent, or Firm—Magdalena M. Fincham

(57) ABSTRACT

Purchasing system methods and apparatus are provided wherein a buyer purchases a first product through a purchasing system, such as by submitting a buyer offer. A retailer receives product redemption information from a buyer, the product redemption information enabling the buyer to take possession of the first product. The retailer determines a substitute product to provide to the buyer, the substitute product being different than the first product. The determination may be based on information contained in the buyer offer, such as a product category, a product class and one or more product features.

89 Claims, 21 Drawing Sheets

U.S. PATENT DOCUMENTS

| | | | |
|---|---|---|---|
| 4,554,446 A | * 11/1985 | Murphy et al. | 235/487 |
| 4,737,910 A | 4/1988 | Kimbrow | |
| 4,766,548 A | 8/1988 | Cedrone et al. | |
| 4,947,028 A | 8/1990 | Gorog | |
| 4,992,940 A | 2/1991 | Dworkin | |
| 5,010,485 A | * 4/1991 | Bigari | 364/408 |
| 5,064,999 A | 11/1991 | Okamoto et al. | |
| 5,117,354 A | 5/1992 | Long et al. | |
| 5,176,224 A | 1/1993 | Spector | 186/52 |
| 5,253,165 A | 10/1993 | Leiseca et al. | |
| 5,256,863 A | 10/1993 | Ferguson et al. | |
| 5,353,218 A | 10/1994 | De Lapa et al. | 364/401 |
| 5,367,452 A | 11/1994 | Gallery et al. | |
| 5,452,344 A | 9/1995 | Larson | |
| 5,513,117 A | 4/1996 | Small | |
| 5,526,257 A | 6/1996 | Lerner | |
| 5,536,045 A | * 7/1996 | Adams | 283/67 |
| 5,546,316 A | 8/1996 | Buckley et al. | |
| 5,550,746 A | 8/1996 | Jacobs | |
| 5,592,378 A | 1/1997 | Cameron et al. | |
| 5,611,051 A | 3/1997 | Pirelli | |
| 5,612,527 A | * 3/1997 | Ovadia | 235/383 |
| 5,631,724 A | 5/1997 | Sawada et al. | |
| 5,637,859 A | 6/1997 | Menoud | |
| 5,692,132 A | 11/1997 | Hogan | |
| 5,701,252 A | 12/1997 | Facchin et al. | |
| 5,713,795 A | 2/1998 | Kohorn | |
| 5,727,163 A | 3/1998 | Bezos | |
| 5,727,164 A | 3/1998 | Kaye et al. | |
| 5,734,150 A | 3/1998 | Brown et al. | |
| 5,739,512 A | 4/1998 | Tognazzini | |
| 5,768,142 A | 6/1998 | Jacobs | 364/479.01 |
| 5,774,874 A | 6/1998 | Veeneman et al. | |
| 5,791,991 A | 8/1998 | Small | |
| 5,794,207 A | 8/1998 | Walker et al. | |
| 5,799,284 A | 8/1998 | Bourquin | |
| 5,809,144 A | 9/1998 | Sirbu et al. | |
| 5,816,918 A | 10/1998 | Kelly et al. | |
| 5,822,736 A | * 10/1998 | Hartman et al. | 705/1 |
| 5,842,178 A | 11/1998 | Giovannoli | |
| 5,845,265 A | 12/1998 | Woolston | 705/37 |
| 5,857,175 A | * 1/1999 | Day et al. | 705/14 |
| 5,870,717 A | 2/1999 | Wiecha | |
| 5,870,719 A | 2/1999 | Maritzen et al. | |
| 5,875,110 A | 2/1999 | Jacobs | |
| 5,878,139 A | 3/1999 | Rosen | |
| 5,878,401 A | * 3/1999 | Joseph | 705/22 |
| 5,883,810 A | 3/1999 | Franklin et al. | |
| 5,887,271 A | 3/1999 | Powell | |
| 5,890,136 A | 3/1999 | Kipp | |
| 5,907,830 A | 5/1999 | Engel et al. | |
| 5,923,016 A | 7/1999 | Fredregill et al. | |
| 5,924,078 A | * 7/1999 | Naftzger | 705/16 |
| 5,924,080 A | * 7/1999 | Johnson | 705/26 |
| 5,924,082 A | 7/1999 | Silverman et al. | 705/37 |
| 5,963,939 A | 10/1999 | McCann et al. | |
| 5,970,469 A | 10/1999 | Scroggie et al. | |
| 5,988,346 A | 11/1999 | Tedesco et al. | |
| 6,014,634 A | 1/2000 | Scroggie et al. | |
| 6,017,157 A | * 1/2000 | Garfinkle et al. | 396/639 |
| 6,035,284 A | 3/2000 | Straub et al. | |
| 6,038,551 A | * 3/2000 | Barlow et al. | 705/41 |
| 6,058,373 A | * 5/2000 | Blinn et al. | 705/26 |
| 6,058,375 A | 5/2000 | Park | |
| 6,061,660 A | * 5/2000 | Eggleston et al. | 705/14 |
| 6,073,840 A | 6/2000 | Marion | |
| 6,085,168 A | 7/2000 | Mori et al. | |
| 6,119,099 A | * 9/2000 | Walker et al. | 705/16 |
| 6,131,085 A | 10/2000 | Rossides | |
| 6,134,534 A | 10/2000 | Walker et al. | 705/26 |
| 6,167,382 A | * 12/2000 | Sparks et al. | 705/26 |
| 6,192,349 B1 | * 2/2001 | Husemann et al. | 705/65 |
| 6,193,154 B1 | 2/2001 | Phillips et al. | |
| 6,193,155 B1 | 2/2001 | Walker et al. | |
| 6,199,014 B1 | 3/2001 | Walker et al. | |
| 6,205,435 B1 | * 3/2001 | Biffar | 705/41 |
| 6,236,971 B1 | 5/2001 | Stefik et al. | |
| 6,247,047 B1 | * 6/2001 | Wolff | 709/219 |
| 6,249,772 B1 | * 6/2001 | Walker et al. | 705/26 |
| 6,260,024 B1 | 7/2001 | Shkedy | |
| 6,266,651 B1 | * 7/2001 | Woolston | 705/27 |
| 6,330,544 B1 | 12/2001 | Walker et al. | |
| 6,370,513 B1 | * 4/2002 | Kolawa et al. | 705/10 |
| 6,512,570 B2 | 1/2003 | Garfinkle et al. | |

FOREIGN PATENT DOCUMENTS

| | | |
|---|---|---|
| EP | 0 779 587 A2 | 9/1996 |
| EP | 0 817 138 A1 | 1/1998 |
| JP | 6035946 | 2/1994 |
| JP | 7078274 | 3/1995 |
| JP | 7272012 | 10/1995 |
| JP | 08137951 | 5/1996 |
| JP | 8221484 | 8/1996 |
| JP | 9097288 | 4/1997 |
| JP | 10187820 | 7/1998 |
| JP | 10214284 | 8/1998 |
| JP | 10240830 | 9/1998 |
| JP | 10269049 | 10/1998 |
| JP | 11088560 A | 3/1999 |
| WO | WO 96/32701 | 10/1996 |
| WO | WO 97/16797 | 5/1997 |
| WO | WO 97/16897 | 5/1997 |
| WO | WO 97/25684 | 7/1997 |
| WO | WO 97/44749 | 11/1997 |
| WO | WO 98/19260 | 5/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |

OTHER PUBLICATIONS

Shea, Barbara, "Read Fine Print When Comparing Car Rentals", Feb. 9, 1997, St. Louis Post–Dispatch, Section: Travel & Leisure, p. 04T.

Website: "CSH Drink Machine(s)", (http//www.csh rit edu/proj/drink html), download date: Jan. 29, 1998.

Desjardins, Doug, "Hollywood's Investment in Online Video Retailer Gets Mixed Reviews", Video Store, Aug. 9, 1998, Section: p. 1, ISSN: 0195–1750.

Website: "FAQ: CSH Coke Machine Information", (http//www cs uu nl/wais/html/na–dir/csh–coke–machine–info html), download date: Oct. 24, 2000.

Website: "United Buying Services", (http www inform umd edu/muc/clubinfo/ubs html), download date: Apr. 15, 2003.

PCT International Search Report for Application No. PCT/US 97/13588, dated Dec. 4, 1997.

Anthony Joseph, "Baby the engine, and other saving tips", The Christian Science Monitor, Nov. 4, 1986; Section: Autos '87 Pullout; p. B10.

"Six vendors sign on the early electronic commerce venture", Phillips Business Information, Inc. Voice Technology News, Dec. 13, 1994; No. 25, vol. 6; ISSN: 1045–1498.

"Coupons & more", welcome to coolsavings.com—Copyright 1996–1999, (http://208.134.230.42/cgi–win/temp-prs.exe/first.htm).

Judith Evans, "Who was the masked Cybershopper?; MasterCard–Visa Agreement on Credit Card Security May Make ON–LINE Commerce Fly", The Washington Post, View Related Topics; Feb. 2, 1996, Final Edition; Section: Financial; p. F01.

"First Virtual Holdings Releases Beta Software for Secure Transactions on Microsoft Merchant Server", PR Newswire, Mar. 31, 1997; Section: Finacial News.

"The easy, pain–free way to buy or lease your next car", What is autoseek; (http://www.autoseek.com//what) download date: May 28, 1997.

Nora Lockwood Toober, "Macy's new gift card gets trial run in Warwick", The Providence Journal–Bulletin; Oct. 3, 1998; Section: Business, p. 1E.

Denise Caruse, "Digital Commerce: The boom in on–line shopping adds a twist to the old quandary of how to tax interstate purchases", The New York Times, View Related Topics, Dec. 28, 1998; Late Edition—Final; Section: C; p. 3; col. 5; Business/Financial Desk.

James Fallon, "Safeway puts ordering into Customers' palms", Executive Technology, Jan. 1999.

"A personal shopping organizer for the web savvy consumer. My KillerApp offers a personalized shopping experience to meet the unique needs of every individual user", (http://www.killerapp.com/html/main/pr0004.html).

"SaveSmart—How SaveSmart Works for Consumers"; (http://savesmart.com/consumer/consumer–howitworks.html), download date: Jan. 17, 1999.

"WebVoucher", (www.pinex.co.uk/webvoucher/), download date: Mar. 14, 1999.

"Welcome to Planet U, providers of U–pons—Internet Coupons"; (http://www.planetu.com/), download date: Mar. 16, 1999.

"Webcerificate, the perfect gift–giving solution . . . It's quick! It's Easy! It's Secure"; (http://www.webcertificate.com:443/webcert/faq–detail.asp), download date: May 20, 1999.

"Kmart expands inventory via in–store kiosks", Jun. 20, 1999, RTNews; (www.retailtech.com).

David Lazarus, "E–Commerce, Japanese style", Wired online page, Jun. 7, 1999.

"Mercata—Group Buying Power"; (http://www.mercata.com/cgi–bin/mercata/mercata/v1/pages/home.jsp), download date: Jun. 7, 1999.

"Wal–Mart vs. Amazon: The fight begins", Yahoo News, Jun. 9, 1999.

"Circuit City to Integrate E–Commerce with store shopping; retailer's E–superstore—www.circuitcity.com– to open in July", PR Newswire, Jun. 15, 1999; Section: Finanical News.

James Frederick, "Walgreens gears for opening of its own Internet pharmacy", Drug Store News, Chain Pharmacy, A Lebhar–Friedman Publication, Jul. 19, 1999.

Shop the Marketplace, 1–800–flowers.com; (http://www.1800flowers.com/flowers/welcome.asp), download date: Aug. 3, 1999.

"The Leader in Internet Shopping Systems for Supermarkets and Drug Stores", groceries online. Copyright 1996 Groceries Online, Inc. (http://www.groceries–online.com/), download date: Aug. 3, 1999.

"Internet Wine Gift Company Offers Answer to Recent Legislation", Yahoo!.FINANCE, PRNewswire, Company Press Release; Aug. 11, 1999.

Stigler, George J., "The Theory of Price", The Macmillan Company, Copyright 1952, pp. 82–94, 214–221.

Bowman, Jr., Ward S., "Tying Arrangements and the Leverage Problem", The Yale Law Journal, Nov. 1957, vol. 67, No. 1, pp. 19–36.

Stigler, George J., "The Theory of Price", The Macmillan Company, Third Edition, Copyright 1966, pp. 82–94, 208–215.

Narasimhan, Chakravarthi, "A Price Discrimination Theory of Coupons", Marketing Science, Spring 1984, vol. 3, No. 2, pp. 128–147.

Godwin, Nadine, "New software was key lure in $17 million agency buyout.", Travel Weekly, Nov. 26, 1984, Section: vol. 43, p. 45, ISSN: 0041–2082.

"Woodside Management Systems Inc. today announced . . . ", PR Newswire, Apr. 1, 1986.

Tellis, Gerard J., "Beyond the Many Faces of Price: An Integration of Pricing Strategies", Journal of Marketing, Oct. 1986, vol. 50, pp. 146–160.

Godwin, Nadine, "Agency, funded by 3M, set to market software; Travelmation touts trip planner to corporations; designed to eliminate client–agent telephone calls; Business Travel Update", Travel Weekly, Oct. 13, 1986, Section: vol. 45, p. 45, ISSN: 0041–2082.

Godwin, Nadine, "Agency dares to launch its own air res system; Travelmation system provides greater versatility, Automation Report", Travel Weekly, Oct. 23, 1986.

"Thomas Cook Travel U.S.A. has announced . . . ", PR Newswire, Jan. 12, 1987.

Bawa, Kapil et al., "The Coupon–Prone Consumer: some Findings Based on Purchase Behavior Across Product Classes", Journal of Marketing, Oct. 1987, vol. 51, pp. 99–110.

Nomani Sr., A., "Air Crashes Stir Signs of Anxiety in Travelers", Wall Street Journal, Aug. 1, 1989, Section 2, p. 1, Col. 1.

Carlsen, Clifford, "From Airline Tickets to Human Organs, the Electronic Markets are Booming", San Francisco Business Times, Aug. 14, 1989, Section: vol. 3, No. 50, Section. 1, p. 17.

Kuttner, Robert, "Computers May Turn the World into One Big commodities Pit.", Business Week, Sep. 11, 1989, Section: Economic Viewpoint, No. 3123, p. 17.

Golden, Fran, "AAL's Riga doubts Marketel's appeal to retailers", Travel Weekly, Nov. 13, 1989, Section: vol. 48, No. 91, p. 4, ISSN: 0041–2082.

Del Rosso, Laura, "Firm proposes ticket–bidding system; Marketel explores electronic auction of travel; Marketel International", Travel Weekly, Nov. 13, 1989, Section: No. 91, vol. 48, p. 1, ISSN: 0041–2082.

"Letters to BusinessExtra", The San Franicsco Chronicle, Dec. 26, 1989, Section: Business, C7.

Wallace, David, "Company Planning to Let Flyers bid on Airfares", Philadelphia Business Journal, Mar. 26, 1990, Section: vol. 9, No. 3, Section 1, p. 15.

Greenberg, Peter S., "The Savvy Traveler: Lower Air Fares For Consumers Not in the Cards . . . " Los Angeles Times, Jul. 8, 1990, Section: Travel, Part L, p. 2, Col. 1, Travel Peak.

Carey, Christopher, "Firm Offers Auction for Airline Tickets", St. Louis Post–Dispatch, Aug. 7, 1991, Section: Business, p. 1B.

Pelline, Jeff, "Travelers Bidding on Airline Tickets SF firm offers chance for cut–rate fares", The San Francisco Chronicle, Aug. 19, 1991, Section: News, p. A4.

Upton, Kim, "News and Briefs: French Say Monoliths Off–Limits to Visitors", Los Angeles Times, Aug. 25, 1991, Section: Travel, Part L, p. 4, Col. 1, Travel Desk.

"Bookit Airfare Bidding System (Fax for Your Plane Ticket?)", Consumer Reports Travel Letter, Sep. 1991, Section: vol. 7, No. 9, pp. 97, 106.

Nelson, Janet, "Practical Traveler; Airlines Relaxing Policy On No–Refund Tickets", The New York Times, Sep. 22, 1991, Section 5, p. 3, Col. 1, Travel Desk.

"Travelers's Notes; Easier Airfare Bidding.", Consumer Reports Travel Letter, Oct. 1991, Section: vol. 7, No. 10, p. 119.

"Buy Low, Fly High", USA Today, Nov. 14, 1991, Section: Bonus, p. 15.

Feldman, Joan M., "To rein in those CRSs; computer reservation systems" Air Transport World, Dec. 1991, Section: vol. 28, No. 12, p. 89, ISSN: 0002–2543.

"Traveler's Notes; Bookit Report", Consumers Reports Travel Letter, Dec. 1991, Section: vol. 7, No. 12, p. 143.

"CRTL's Blue Ribbon Deals for 1992", Consumer Reports Travel Letter, Jan. 1992, Section: vol. 8, No. 1, pp. 3–5.

"Newletters", The Atlanta Journal and Constitution, Mar. 1, 1992, Section: Travel: Section K, p. 13.

Del Rosso, Laura, "Ticket–bidding firm closes its doors, Marketel International", Travel Weekly, Mar. 12, 1992, Section: vol. 51, No. 21, p. 1; ISSN: 0041–2082.

Hainer, Cathy et al., "Where vacationing kids get good care", USA Today, Apr. 1, 1992, Section: Life, p. 4D.

Weatherford, Lawrence R. and Bodily, Samuel E., "A Taxonomy and Research Overview of Perishable–Asset Revenue Management: Yield Management, Overbooking, and Pricing", Operations Research, Sep.–Oct. 1992, vol. 40, No. 5, pp. 831–844.

Spencer, Milton H. and Amos, Jr., Orley M., "Contemporary Economics, Eight Edition", Worth Publishers, Copyright 1993.

Rajendran, K.N. and Tellis, Gerard J., "Contextual and Temporal Components of Reference Price", Journal of Marketing, Jan. 1994, pp. 22–34.

Feldman, Joan M., "Reclaiming control; new software to close gap between projected and actual revenues", Aug. 1995, Section: vol. 32, No. 8, p. 35, ISSN: 0002–2543.

United Sates v. Eastman Kodak Co., United States Court of Appeals for the Second Circuit, decided Aug. 4, 1995.

Bronnenberg, Bart J., "Limited Choice Sets, Local Price Response, and Implied Measures of Price Competition", Journal of Marketing Research, Spring 1996, Section: vol. XXXIII, p. 163.

Prentice, Michael, "Searching for the lowest fare: Getting the lowest fare takes work, but it's worth the effort", The Ottawa Citizen, Oct. 9, 1996, Section: Citylife; Consuming Passion, p. C3.

"Auctioning unsold airline tickets", Insight (USA), download date: Oct. 29, 1996.

"Web Ventures presents Bookit!", (http www webventures com/bookit), download date: Dec. 2, 1996.

"Salomon Brother's Maldutic Says Internet is Aviation's 'Third Revolution,' Will Earn Billions", World Airline News, Mar. 21, 1997, Section: vol. 7, No. 12.

Feldman, Joan M., "Pricing and cybersales; Internet airline ticket sales and reservations", Feb. 1998, Section: No. 2, vol. 35, p. 64, ISSN: 0002–2543.

Adyanthaya, Surain, "Revenue Management: the Black Art." Interavia Business & Technology, Sep. 1998, Section: No. 623, vol. 53, p. 43, ISSN: 0983–1592.

"A Personal Information Manager For the Web Savvy Consumer.", (http www killerapp com/html/main/pr0004 html), Oct. 2, 1998.

"Airfare Bargains on the Net: About E–mail Lists", (http// travel epicurious com/travel/c_planning/02_airfares/email/ intro html), download date: Oct. 5, 1998.

"Airtech—FlightPass Faq", (http//www airtech com/at_ flightpass/at_faqflightpass htm), download date: Oct. 5, 1998.

Woolley, Scott, "I got it cheaper than you", Forbes, Nov. 2, 1998, Section: Management, Strategies, Trends, p. 82.

"Travel Industry Bellwether for All Commerce Players", Jupiter Communications, Copyright 1999, Jupiter Strategic Planning Services.

Press Release, "Priceline.com Delivers Savings For Flexible Travelers In Side–By–Side Price Compairson", Priceline.com, Stamford, CT, May 28, 1999.

Website: "Pricing, The Professional Pricing Society Conference Agenda", (http//www pricing–advisor com/conf_agn htm), download date: Jun. 19, 1999.

"Chakravarthi Narasimhan", (http www olin wustl edu/ faculty/narasimhan/), download date: Jul. 1, 1999.

Varian, Hal R., "First Monday: Differential Pricing and Efficiency", (http www firstmonday dk/issues/issue2/different/), download date: Jul. 1, 1999.

"Pricing Strategy and Tactics", (http //www Vanderbilt edu/ econ/reiley/ba250/outlines/21 html), download date: Jul. 1, 1999.

Odlyzko, Andrew, "The Bumpy Road of Electronic Commerce", (http//aace Virginia edu/aace/conf/webnet/html/ao htm), download date: Jul. 1, 1999.

Website: "DealTime com: The Ultimate Online Shopping Service", (http www dealtime com/about/aboutbodyhome asp?B=dealtime&AID=0), download date: Oct. 20, 1999.

Kephart, Jeff, "Price Dynamics of Vertically; Introduction", (http //www research ibm com/infoecon . . . ), download date: Nov. 11, 1999.

Website: "Frictionless Commerce Incorporated: Solutions", (http www frictionless com/solutions html), dowload date: Nov. 11, 1999.

Office Action for Appl. Ser. No. 09/348,566, Examiner James Zurita, mailed Oct. 1, 2003, pp. 3–5.

Naik, Gautam, "In Digital Dorm, Click on Return for Soda", The Wall Street Journal Online, undated.

"Brother Industries is pushing ahead with its new PC software vending machine operation in a bid to boost revenues in the filed to 10 billion yet by 1995", IDC Japan Report, Aug. 30, 1991, Secton: vol. 17, p. 53.

"FAQ: CSH Coke Machine Information", FAQ, May 23, 1994, vol. 1.2, (http //www cs uu nl/wais/html/na–dir/ csh–coke–machine–info html).

Maras, Elliot, "1995: downsizing adds costs; new strategies sought", Automatic Merchandiser, Aug. 1996, pp. 20–22, 24, 26, 28, 30, 32, 34, 36, 38, 40, 44, Section: State of the Industry Report.

Website: "Computer Science House: Projects: Drink Machine", (http //www csh rit edu/proj/drink html), download date: Jan. 29, 1998.

Desjardins, Doug, "Hollywood's investment in online video retailer gets mixed reviews", Video Store, Aug. 9, 1998, vol. 20, No. 32, p. 1+, ISSN: 0195–1750.

* cited by examiner

| PRODUCT IDENTIFIER 502 | PRODUCT DESCRIPTOR 504 | PRODUCT CATEGORY 506 | PRODUCT CLASS 508 | PRODUCT FEATURE(S) 510 | MINIMUM ACCEPTABLE PRICE 512 | SUBSTITUTE PRODUCT IDENTIFIER(S) 514 |
|---|---|---|---|---|---|---|
| TV-0154 | PHILIPS MAGNAVOX, 48" STEREO PROJECTION TV W/ PICTURE-IN-PICTURE & UNIVERSAL REMOTE | TV | II | PIP; REMOTE | $650.00 | TV-0002, TV-0155 |
| TV-0155 | TOSHIBA 50" PROJECTION TV W/ EASY 2-TUNER PICTURE-IN-PICTURE | TV | II | PIP | $500.00 | TV-0154 |
| TV-0156 | PANASONIC 32" STEREO TV W/ REMOTE | TV | III | REMOTE | $279.99 | TV-0157, TV-0023 |
| TV-0157 | SONY 32" STEREO TV W/ PICTURE-IN-PICTURE & UNIVERSAL REMOTE | TV | I | PIP | $399.99 | TV-0156, TV-0098 |
| TV-0158 | PANASONIC 27" STEREO TV W/ 2-TUNER PICTURE-IN-PICTURE & UNIVERSAL REMOTE | TV | II | PIP; REMOTE | $299.99 | TV-0076 |

FIG. 5

| PRODUCT IDENTIFIER 602 | AMOUNT IN INVENTORY 604 |
|---|---|
| TV-0154 | 5 |
| TV-0155 | 6 |
| TV-0156 | 0 |
| TV-0157 | 10 |
| TV-0158 | 11 |

FIG. 6

| PRODUCT IDENTIFIER 702 | RETAIL PRICE 704 | COST 706 | SETTLEMENT PRICE 708 |
|---|---|---|---|
| TV-0154 | $725.00 | $400.00 | $500.00 |
| TV-0155 | $550.00 | $350.00 | $425.00 |
| TV-0156 | $325.00 | $150.00 | $220.00 |
| TV-0157 | $300.00 | $125.00 | $150.00 |
| TV-0158 | $350.00 | $195.00 | $275.00 |

FIG. 7

| TRANSACTION IDENTIFIER 802 | REDEMPTION CODE 804 | FIRST PRODUCT IDENTIFIER 806 | FIRST PRODUCT STATUS 808 | SUBSTITUTE PRODUCT IDENTIFIER 810 | EXPECTED PAYMENT AMOUNT 812 | PAYMENT STATUS 814 |
|---|---|---|---|---|---|---|
| T103-222-99 | 29712-8565 | TV-0155 | SWITCHED | TV-0154 | $575.00 | PAID |
| T103-223-01 | 29712-8566 | ST-3385 | REDEEMED | N/A | $125.00 | PENDING |
| T103-225-32 | 29712-8567 | CD-0003 | PENDING | N/A | $60.00 | PENDING |
| T105-131-41 | 1111-2222-3333-4444 | TV-0122 | SWITCHED | TV-0122-1 | $325.00 | PAID |
| T105-972-49 | BUYER-PASSWORD | VCR-0098 | SWITCHED | VCR-0088 | $100.00 | PENDING |

800a → row 1
800b → row 2
800c → row 3
800d → row 4
800e → row 5

| OFFER IDENTIFIER 902 | REDEMPTION CODE 904 | BUYER IDENTIFER 906 | FIRST PRODUCT IDENTIFIER 908 | BUYER'S PRICE 910 | FIRST PRODUCT STATUS 912 | FIRST SUBSIDY AMOUNT 914 | AUTHORIZED RETAILER IDENTIFIERS 916 | REDEMPTION RETAILER IDENTIFIER 918 |
|---|---|---|---|---|---|---|---|---|
| O-123-4321 | 123321 | 99-036 | TV-0155 | $300 | SWITCHED | N/A | R031-2; R192-05; R302-11 | R192-05 |
| O-123-4322 | 1234-5678-9012-3456 | 99-254 | P051-33 | $120 | REDEEMED | $5 | R031-2; R129-01 | R129-01 |
| O-123-4323 | 1111-2222-3333-4444 | 99-319 | P021-99 | $250 | SWITCHED | $15 | R031-2 | R129-01 |

| AMOUNT OWED TO RETAILER 920 | SUBSTITUTE PRODUCT IDENTIFIER 922 | BUYER'S SUBSTITUTE PRICE 924 | SUBSTITUTE SUBSIDY AMOUNT 926 | OFFER PRODUCT CATEGORY 928 | OFFER PRODUCT CLASS 930 | OFFER PRODUCT FEATURE(S) 932 |
|---|---|---|---|---|---|---|
| $300.00 | TV-0154 | $325 | $10 | TV | I | REMOTE; PIP |
| $105 | N/A | N/A | N/A | P | II | 3-2 |
| $260 | VCR-1001 | $250 | $15 | VCR | I | REMOTE |

| PRODUCT IDENTIFIER: | TV-0154 |
|---|---|
| SUBSIDY AMOUNT: | $25.00 |
| SUBSIDY PROVIDER: | SP-101 |

| RETAILER IDENTIFIER 1008 | SETTLEMENT PRICE 1010 |
|---|---|
| R064-44 | $500.00 |
| R107-77 | $505.00 |
| R304-44 | $500.00 |

METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER

CROSS-REFERENCE TO RELATED APPLICATIONS

The present application is a continuation-in-part of: U.S. patent application Ser. No. 09/337,906 filed Jun. 22, 1999 and entitled "Purchasing Systems and Methods Wherein a Buyer Takes Possession at a Retailer of a Product Purchased Using a Communication Network" which issued as U.S. Pat. No. 6,754,636 B1 on Jun. 22, 2004; which is a continuation-in-part of U.S. patent applications Ser. No. 08/889,503 filed Jul. 8, 1997 and entitled "System and Process for Local Acquisition of Products Priced Online" which issued as U.S. Pat. No. 6,249,772; Ser. No. 08/889,319 filed Jul. 8, 1997 and entitled "Conditional Purchase Offer Management System" which issued as U.S. Pat. No. 6,085,169; Ser. No. 09/190,744 filed Nov. 12, 1998 and entitled "Method and Apparatus for A Cryptographically Assisted Commercial Network System Designed to Facilitate Buyer-Driven Conditional Purchase Offers", which is now abandoned; which is a continuation-in-part of U.S. Pat. No. 5,794,207, filed Sep. 4, 1996; and Ser. No. 09/083,345 filed May 22, 1998 and entitled "Method and Apparatus for Managing Remote Vending Machine Transactions" which is now abandoned. The entire contents of these applications are hereby incorporated by reference.

The present application is also related to the subject matter of U.S. patent applications Ser. No. 08/943,483 filed Oct. 3, 1997 and entitled "System and Method for Facilitating Acceptance of Conditional Purchase Offers" which is now abandoned; Ser. No. 08/858,738 filed May 19, 1997 and entitled "System and Process for Issuing and Managing Forced Redemption Vouchers Having Alias Account Numbers" which is now abandoned; and Ser. No. 08/997,680 filed Dec. 23, 1997 and entitled "Method and Apparatus for Issuing and Managing Gift Certificates" (96-139X). The entire contents of these applications are hereby incorporated by reference.

FIELD OF THE INVENTION

The present invention relates to the sale of products. In particular, the present invention relates to methods and apparatus wherein a buyer arranges to purchase a first product using a communication network and subsequently takes possession of a substitute product at a retailer.

BACKGROUND OF THE INVENTION

Typically, a buyer visits one or more retailers to shop for a product. When the buyer finds the product he or she is looking for, at a reasonable price, the buyer purchases the product from the retailer. This traditional method of providing products to buyers, however, may require that the buyer visit a number of retailers to determine what should be considered a reasonable price for the product.

Moreover, the traditional method of selling a product to a buyer requires that a retailer attract buyers, such as by spending money on advertising. For example, when a new retail store opens for business, many buyers will not know what products the store sells. In addition, traditional methods do not let a product manufacturer establish a pricing relationship directly with buyers when the product is provided to buyers through one or more retailers. For example, a manufacturer may sell a product to a retailer (perhaps through a distributor) that ultimately decides the price at which the product is sold to buyers.

Recently, products have been sold to buyers through communication networks, such as with online transactions completed through the Internet. Internet sales have been growing steadily over the past few years, and are expected to continue increasing because buyers are attracted to the ease and convenience of shopping online. For example, a buyer can shop online from the comfort of home at any time of the day or night.

Another advantage of online shopping is that pricing comparisons are less time consuming. For example, a Web service can compile prices from various sources (e.g., Web merchants and/or retail stores that are not online) for various products. This lets a buyer easily find and select, for example, a retail store that offers the lowest price for a product. Although this will save a buyer time, only regular retail prices (which the buyer would eventually be able to find without the Web site) are typically reported without providing any other pricing advantage. As price information becomes more accessible, buyers are growing more price sensitive and demand that products be sold at lower prices.

Having a product shipped to a buyer, which is the conventional mode of delivering a product purchased online, presents several drawbacks. For example, many buyers are not home during the day and cannot sign for, or otherwise arrange to receive, the product from a delivery service. In addition, the shipping service itself presents an additional cost that, depending on the product, may offset any savings made possible by shopping online. Finally, some products simply cannot be delivered at all, such as a service provided to buyers.

With respect to a buyer, another disadvantage of online shopping is the delay involved with receiving a product. The online shopping community has not effectively captured the impulsive and impatient buyer market, because a buyer is more likely to impulsively purchase a product when he or she can take immediate possession of the product (instead of waiting several days for delivery). In other words, a buyer who wants a product immediately is likely to visit a retailer and not buy the product online.

With respect to retail stores that are not online, online shopping presents additional problems. For example, the retail store is typically left completely out of any online shopping transaction. In addition to losing the potential profit from the sale of the product itself, the store loses any chance of selling the buyer additional items during a visit, such as peripherals for the product or even unrelated items that attract the buyer's attention while he or she is in the store. This would still be a problem even if the store invested the time and money required to establish an online shopping service. Moreover, the store's online service may simply shift sales that would have otherwise occurred at the actual store (as opposed to attracting new buyers).

With respect to manufacturers, the availability of online shopping does little to solve the problem of establishing a pricing relationship directly with buyers. Some manufacturers have attempted to establish such a relationship by establishing an online shopping service. However, a manufacturer that establishes such a service competes directly with its retailers' traditional distribution channel and therefore risks alienating retailers that also sell the manufacturer's product. Additionally, establishing such a service requires the manufacturer to take on additional cost and responsibility in attracting and servicing customers directly.

In U.S. patent application Ser. No. 09/337,906 filed Jun. 22, 1999 and entitled "Purchasing Systems and Methods Wherein a Buyer Takes Possession at a Retailer of a Product Purchased Using a Communication Network" (99-013) applicants disclose methods and systems wherein a purchasing system solves many of the problems discussed above. However, when a buyer purchases a first product using such a purchasing system and attempts to take possession of the first product at a retailer, the retailer may not have the first product in stock or may prefer that the buyer take possession of another product instead. Therefore, a need exists for further systems and methods wherein a buyer arranges to purchase a first product using a communication network and subsequently takes possession of a substitute product at a retailer.

SUMMARY OF THE INVENTION

To alleviate the problems inherent in the prior art and to facilitate the provision and redemption of substitute products, the present invention introduces purchasing system methods and apparatus wherein a buyer arranges to purchase a first product using a communication network and subsequently takes possession of a substitute product at a retailer.

In one embodiment of the present invention, a buyer purchases a first product through a purchasing system, such as by submitting a buyer offer and having the buyer offer accepted. A retailer receives product redemption information from the buyer, the product redemption information enabling the buyer to take possession of the first product. The retailer determines a substitute product to provide to the buyer, the substitute product being different than the first product. The determination may be based on, for example, information contained in the redemption information or on information in the buyer offer, such as a product category, a product class and one or more product features.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 5 is a tabular representation of a portion of a product database according to an embodiment of the present invention.

FIG. 6 is a tabular representation of a portion of an inventory database according to an embodiment of the present invention.

FIG. 7 is a tabular representation of a portion of a price database according to an embodiment of the present invention.

FIG. 8 is a tabular representation of a portion of a transaction database according to an embodiment of the present invention.

FIGS. 9A and 9B are a tabular representation of a portion of an accepted offer database according to an embodiment of the present invention.

FIG. 10 is a tabular representation of a portion of a product subsidy database according to an embodiment of the present invention.

DETAILED DESCRIPTION OF THE INVENTION

The present invention is directed to systems and methods wherein a buyer arranges to purchase a first product using a communication network and subsequently takes possession of a substitute product at a retailer. Consider, for example, a buyer that arranges to purchase a first product using a purchasing system and to take possession of the first product at a retailer. When the buyer visits the retailer, however, the retailer may not have the first product in stock. According to an embodiment of the present invention, the retailer determines (i.e., selects) and offers a substitute product to the buyer (instead of the first product). According to one embodiment of the present invention, the retailer determines and offers the substitute product to the buyer based on the profitability of the first product and the profitability of the substitute product even when the retailer has the first product in stock. As will be explained, the present invention may be implemented using many different methods and parameters to determine a substitute product, including a determination of whether or not a substitute product will be offered at all.

Figure 1A:
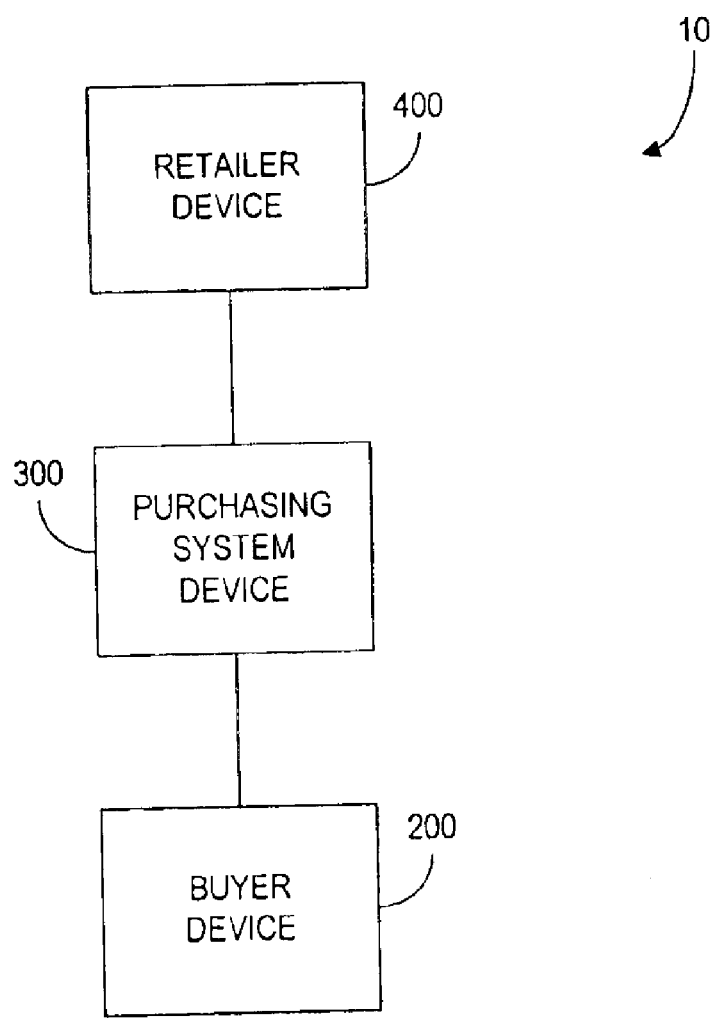
FIGS. 1A and 1B are block diagram overviews of purchasing systems in which a buyer arranges to purchase a first product using a communication network and subsequently takes possession of a substitute product at a retailer according to an embodiment of the present invention.

Turning now in detail to the drawings, FIG. 1A is a block diagram overview of a system 10 according to one embodiment of the present invention. The system 10 includes a buyer device 200 coupled to a purchasing system device 300. As used herein, a device (including a buyer device 200, the purchasing system device 300 and a retailer device 400) may be coupled, for example, through a communication network, such as a Local Area Network (LAN), a Wide Area Network (WAN), a Public Switched Telephone Network (PSTN), or an Internet Protocol (IP) network such as the Internet, an intranet or an extranet. Moreover, as used herein, communications include those enabled by cellular, satellite, or radio technology.

In one embodiment of the present invention, the buyer device 200 communicates with a remote Web-based purchasing system device 300 (e.g., a server) through the Internet. Although embodiments of the present invention will be described with respect to information exchanged using a Web site, according to other embodiments of the present invention information may instead be exchanged between devices (including the buyer device 200 and the purchasing system device 300) using, for example: a telephone; a facsimile machine; e-mail; a WEBTV interface; a cable network interface; or a wireless device.

Information exchanged between a buyer and the purchasing system device 300 (as well as between a retailer or seller and the purchasing system device 300), may also use a Voice Response Unit (VRU) or Interactive VRU (IVRU). Examples of IVRUs include the Vision 2001 and the Insight IVR/Web from Interactive Voice Technologies, Corp. and the OmniVox for Windows NT from APEX Voice Communications. In general, an IVRU lets a user of a DTMF (Dual Tone Multi-Frequency) tone-generating telephone, also known as "push button" telephone, communicate with a computer. The DTMF signals received from a user's telephone are interpreted by the WRU, which may also send information to the user, such as a list of IVRU menu options. The buyer device 200 may be, for example, a Personal Computer (PC), a portable computing device such as a Personal Digital Assistant (PDA), a wired or wireless telephone, a one-way or two-way pager, a kiosk, an Automated Teller Machine (ATM), a watch enabled to communicate through a network, or any other appropriate communication device.

According to one embodiment of the present invention, the purchasing system device 300 receives a buyer offer, including a buyer-defined offer price, related to a first product to be purchased. The buyer offer may be "binding" in that a buyer cannot revoke an offer that has been accepted by a seller. One example of a buyer offer, called a Conditional Purchase Offer (CPO), is described in U.S. Pat. No. 5,794,207 and U.S. patent application Ser. No. 08/889,319, the entire contents of which are hereby incorporated by reference. A buyer offer may be, for example, an electronic message from a buyer including an offer price for a first product.

Information about the buyer offer may then be, for example, sent to one or more sellers or compared to information previously received from one or more sellers. If the buyer offer will be accepted by a seller, the buyer pays the offer price to the purchasing system, and the first product is provided to the buyer by a retailer. The purchasing system, in turn, provides a payment to the retailer for providing the first product to the buyer. Such a payment to the retailer will be referred to herein as a "settlement" price or amount, and may be equal to, less than or more than the retail price the retailer typically charges a customer for the first product. According to other embodiments of the present invention, a purchasing system price (e.g., a price a buyer will provide in exchange for a product) can be established using any method, including seller-driven pricing models (e.g., wherein a seller sets the price and the buyer accepts the seller-defined price).

In addition to an offer price, the buyer offer can include other information, such as a first product category, a first product class, a first product manufacturer and model number, and/or one or more first product features. For example, the buyer offer may indicate that the buyer will pay $500 (the offer price) for a television (the first product category) made by a well-respected manufacturer and having a 32 inch screen (the first product class) and surround sound (a first product feature). According to an embodiment of the present invention, the purchasing system device 300 communicates with the buyer device 200 to establish a first price for a first product with the buyer. The purchasing system device 300 also arranges for the buyer to take possession of the first product at a retailer, different than the seller of the product, that offers the first product for sale. Note that, as used herein, a "seller" may be, for example, a product manufacturer, a retailer, the purchasing system or any other party.

According to one embodiment of the present invention, the purchasing system device 300 transmits redemption information, such as information including a "redemption code," to the buyer. As used herein, a redemption code may be anything capable of being identified that represents the right of the buyer to take possession of the first product at a retailer. The redemption information can also include information that enables the creation of a voucher. For example, a printer attached to the buyer device 200 may be used to print a coupon-like voucher including the redemption code.

Verification information, which enables the retailer to authorize the buyer to take possession of the first product, is transmitted from the purchasing system device 300 to a retailer device 400. The retailer may then evaluate a redemption code provided by the buyer, using the verification information, to determine if the buyer is authorized to take possession of the first product.

The buyer may provide a payment, based on the first price, to the purchasing system in exchange for the right to take possession of the first product at the retailer. The purchasing system, in turn, provides payment to the retailer in exchange for providing the first product to the buyer.

According to another embodiment of the present invention, information related to an attempt to take possession of the first product, including the redemption code, is sent from the retailer device 400 to the purchasing system device 300. In this case, the purchasing system device 300 can send back a verification, authorizing the buyer to take possession of the first product, to the retailer device 400. Those skilled in the art will recognize that information may be exchanged between the buyer device 200 and the purchasing system device 300 and between the retailer device 400 and the purchasing system device 300 using different communication networks.

Figure 1B:
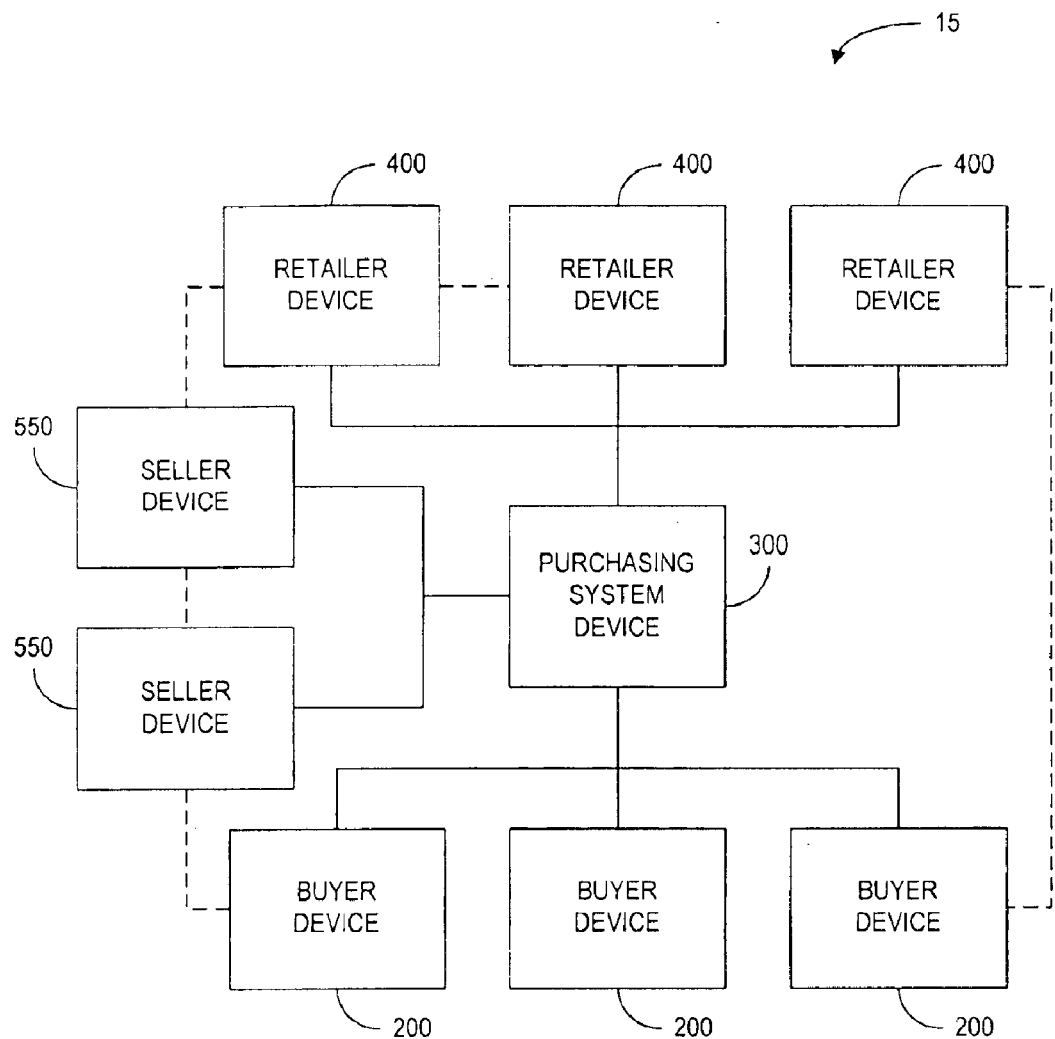

According to one embodiment of the present invention, the purchasing system device 300 arranges for the buyer to purchase the first product from a seller. This may be accomplished, for example, by having the purchasing system device 300 communicate with a number of seller devices (as shown in FIG. 1B). The purchasing system device 300 also arranges for the buyer to take possession of the first product at a retailer.

It should be noted that, as used herein, a "product" (including a first product or a substitute product) may be, for example, a new or used consumer product such as an electronic device. A product may also be any other good or service that a buyer can take possession of at a retailer. In the case of a service, the product may be, for example, a car tune-up that the buyer "takes possession of" at a car service center (i.e., the buyer receives the service from the car service center). A product may also be a package of multiple items and/or services. For example, a product may be a television and a Video Cassette Recorder (VCR). In this case, the purchasing system could arrange for the buyer to take possession of both items at a single retailer or at different retailers.

As used herein, a "retailer" may be any entity capable of providing a product to a buyer. For example, a retailer might be a single retail shop, a chain of consumer electronic "superstores," one or more retail stores within a chain, a wholesaler, a franchisee, a franchiser, or even a warehouse where products are stored.

According to the present invention, the purchasing system device 300 and/or the retailer device 400 determine a substitute product to provide to the buyer in place of the first product, such as when the retailer does not have the first product in stock. The determination may be based on, for example, information contained in the buyer offer, such as the product category, the product class and one or more product features.

Referring now to the system 15 shown in FIG. 1B, seller devices 550 may communicate with the purchasing system device 300 with respect to one or more buyer transactions. For example, a seller device 550 may agree to sell a first product to a buyer or may permit a substitute product to be offered to the buyer in place of the first product.

A buyer device may also communicate directly with a retailer device 400 or a seller device 550 as shown in dashed lines in system 15 of FIG. 1B. For example, the buyer device 200 may be a PDA (including, for example, a PALM PILOT® PDA running POCKET SHOPPER™ software available from MY SIMON™). In this case, the buyer device 200 communicating with the retailer device 400 may be, according to one embodiment of the present invention, different than the buyer device 200 that communicates with the purchasing system device 300. By way of example, the buyer may access a Web site, maintained by the purchasing system, using a PC to arrange to purchase a first product. The buyer may receive a redemption code for the first product and store the code on his or her PDA. In this way, when the buyer visits a retailer to take possession of the first product (or, as explained herein, a substitute product), the redemption code may be communicated directly from the PDA to the retailer device 400.

Similarly, a seller device 550 may communicate with other seller devices or buyer devices 200 (e.g., to determine or authorize a substitute product). In addition, a retailer device 400 may communicate with other retailer devices 400 or seller devices 550 (e.g., to determine or authorize a substitute product).

Note that some or all of the actions associated with the purchasing system device 300 may be performed by a retailer, a first product manufacturer, or a party other than the retailer and the first product manufacturer.

Purchasing System Vouchers

Figure 2:
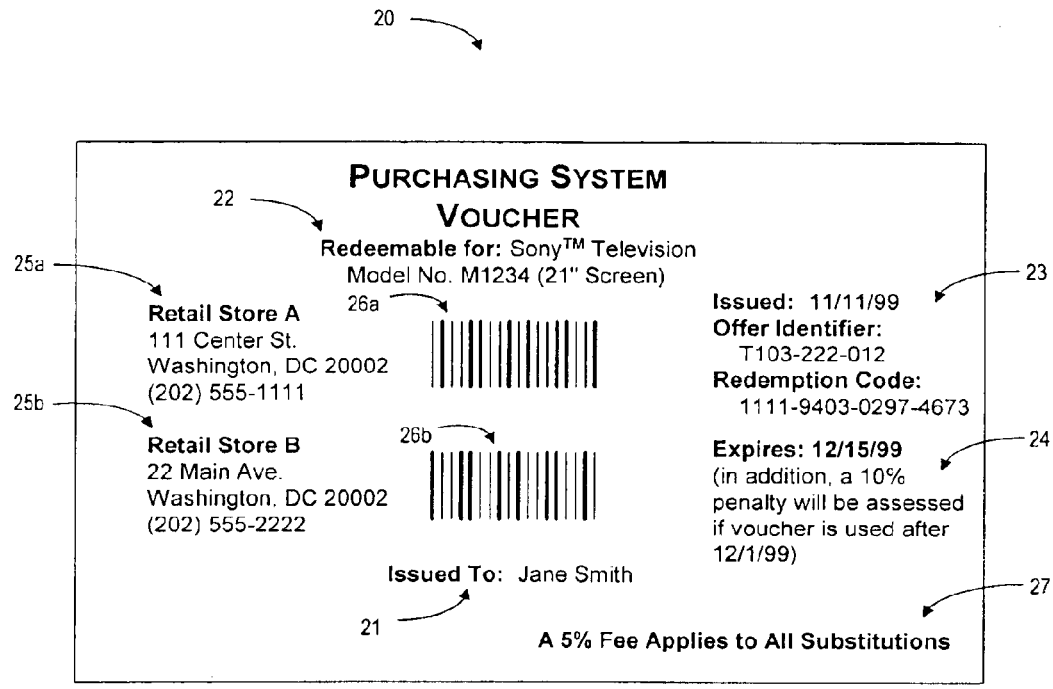
FIG. 2 illustrates a purchasing system voucher, including supplemental offer information, according to an embodiment of the present invention.

As previously noted, the purchasing system device 300 may output redemption information, including information enabling a retailer to authorize the buyer to take possession of the first product. The information can be transmitted to the buyer, for example, such that the buyer can use the information to print a coupon-like voucher, such as the purchasing system voucher 20 shown in FIG. 2.

In general, the information printed on the purchasing system voucher 20 may include: the name of the buyer 21; a description of the first product being purchased 22 (perhaps with an identifier, such as a bar code); a field 23 listing an issue date, an offer identifier and a redemption code associated with the voucher 20; and an expiration date and/or penalty information field 24. Note that a number of different first products 22 may be listed on a voucher. This may be necessary, for example, if multiple first products are being purchased or if different retailers use different bar codes, model names, etc. for a single first product.

The buyer may have the option of going to a number of different retailers listed on the voucher 20 to take possession of the first product. For example, the voucher 20 shown in FIG. 2 lists two retailers 25a, 25b. In one embodiment, the voucher 20 may only be redeemable through a single retailer or a particular group of retailer (e.g., a specific retail store acting as a seller of the product, a subset of retail stores in a national chain, or all retail stores in a national chain). Some or all of the information illustrated on the voucher may also be stored on the voucher in the form of one or more bar codes 26a, 26b.

A bar code on the voucher (such as those identifying the retailer identifiers 26a, 26b) may also include a first product identifier. In one such an embodiment, a cashier at the POS terminal can scan the voucher 20 along with the first product and, if the first product identifier encoded into the bar code matches the scanned first product identifier, the transaction can be locally authorized. The bar code may also be used to authorize the transaction based on whether data stored in a database matches information about the current transaction (i.e., the redemption information is redeemable at that retailer for the first product).

Instead of a printed voucher 20, the redemption information may instead simply be a numeric or alphanumeric identifier provided to the buyer. In this case, the buyer could write the information down (such as when receiving the information over the telephone) and provide the information to the retailer when taking possession of the first product. The buyer could also store the information, such as in a PDA or other device capable of storing information, and transmit the information, for example, to a Point of Sale (POS) device.

According to another embodiment of the present invention, redemption information may be, for example, information encoded using, for example, cryptographic techniques. Applicable encryption techniques are described in Bruce Schneier, "Applied Cryptography: Protocols, Algorithms, and Source Code in C" (John Wiley & Sons, Inc., 2nd Ed. 1996). The information may also be stored electronically, such as in a smart-card type device, a PDA or a removable memory device. A single voucher 20 may be redeemable at a number of different retailers 25a, 25b—or separate vouchers can be printed for each retailer. In this case, when one voucher is redeemed the remaining vouchers can be made invalid, such as by changing a value associated with the redemption identifier in a database.

According to one embodiment of the present invention, the voucher 20 may also include substitution conditions and penalty information 27. For example, the voucher 20 may indicate "no substitutions are allowed," "only substitutions pre-approved by the purchasing system are allowed," or "a 5% fee applies to all substitutions" (i.e., a fee equal to 5% of the buyer's price applies to all substitutions). Note that, according to one embodiment of the present invention, the retailer (or another party, such as the buyer or product manufacturer) may provide a fee (e.g., a commission) to the purchasing system in order to supply a buyer with a substitute product. According to another embodiment of the present invention, the substitute product is determined by the purchasing system (and included on the voucher) when the buyer arranges to purchase the first product. In this case, the retailer may simply notify the purchasing system which product was actually provided to the buyer.

According to another embodiment of the present invention, the purchasing system voucher 20 does not indicate a particular product 22, but instead indicates the requirements that the product must satisfy (e.g., a product category, class and feature). For example, the voucher may simply indicate that the voucher is redeemable for "any 32 inch television, class II, with surround sound." Such a voucher may also indicate that any television provided to the buyer in exchange for the voucher must be pre-approved by the purchasing system.

According to still another embodiment of the present invention, the purchasing system voucher 20 indicates the particular product 22 and the requirements that a substitute product must satisfy. In such an embodiment, as well as in other embodiments, the retailer may agree to accept a settlement price associated with the first product from the purchasing system when a substitute product is provided to the buyer.

The devices comprising the redemption system 10 will now be explained in greater detail with respect to FIGS. 3 and 4.

Purchasing System Device

Figure 3:
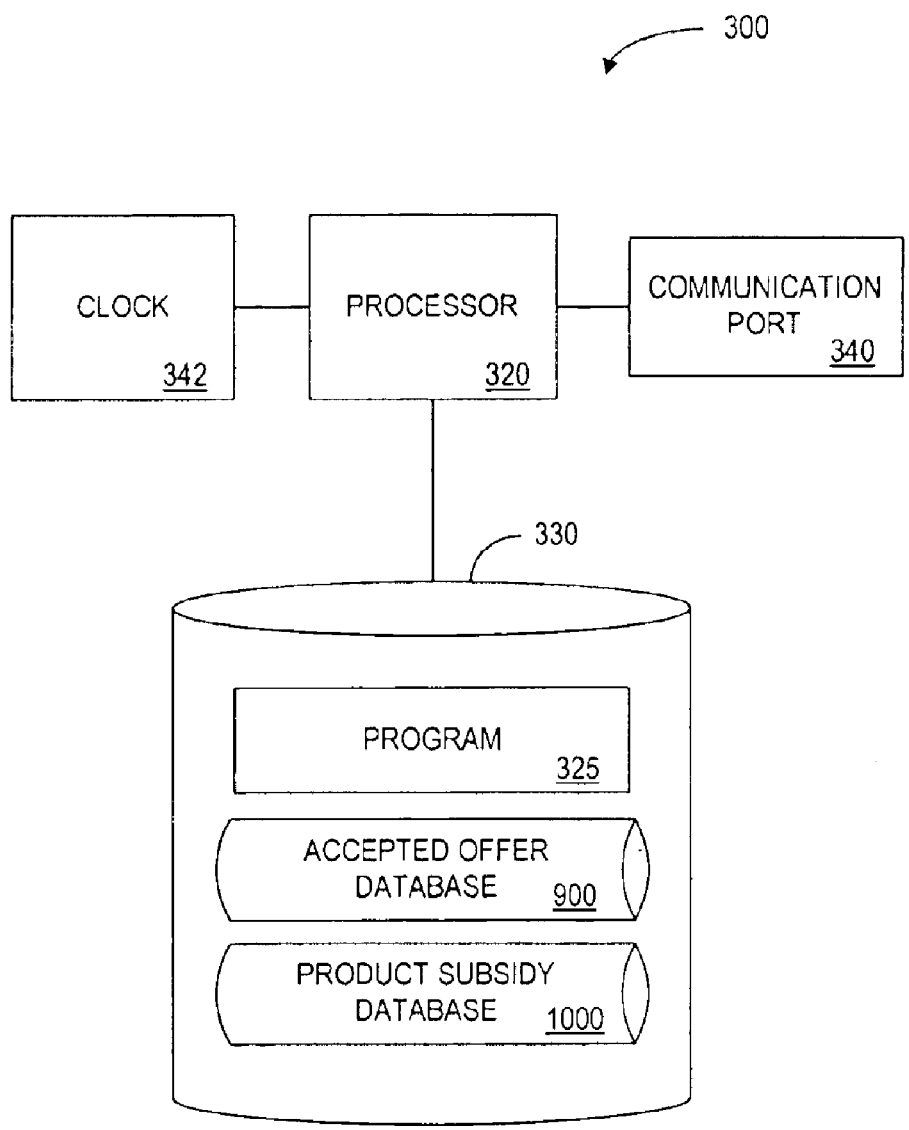
FIG. 3 is a block schematic diagram of a purchasing system device according to an embodiment of the present invention.

FIG. 3 illustrates a purchasing system device 300 that is descriptive of the device shown in FIGS. 1A and 1B according to an embodiment of the present invention. As will be appreciated, portions of the descriptions of the various elements described with respect to FIG. 3 will also be applicable to the other devices comprising the redemption system 10. The purchasing system device 300 comprises a processor 320, such as one or more Pentium® processors, coupled to: a communication port 340 configured to communicate through a communication network (not shown in FIG. 3); and a clock 342 (such as a clock that supplies the current date and time for use by the purchasing system device 300). The communication port 340 may be used to communicate, for example, with a buyer device 200, a retailer device 400 or a seller device 550 to let a retailer offer a substitute product to a buyer.

The processor 320 is also in communication with a storage device 330. The storage device 330 may comprise any appropriate storage device, including combinations of magnetic storage devices (e.g., a hard disk drive), optical storage devices, or semiconductor memory, such as Random Access Memory (RAM) and Read Only Memory (ROM).

The storage device 330 stores a program 325 for controlling the processor 320. The processor 320 performs instructions of the program 325, and thereby operates in accordance with the present invention. For example, the processor 320 may arrange through a communication network for a buyer to purchase a first product from a seller. The processor 320 may also send product redemption information to the buyer, including information enabling the buyer to take possession of the first product at a retailer. The processor 320 may receive from the retailer information related to an attempt to provide a substitute product to the buyer and send to the retailer verification information enabling the retailer to authorize the buyer to take possession of the substitute product.

According to one embodiment of the present invention, the purchasing system device 300 determines a particular substitute product (or a group of substitute product choices) to provide to a buyer or approves a retailer's request to provide a particular substitute product to a buyer. The factors considered when making such a determination or providing such approval are described in greater detail with respect to FIG. 4 (e.g., some of the same factors are considered in the embodiment wherein the retailer device 400 determines a substitute product) and may be based on information stored in the purchasing system device 300 (e.g., in a product subsidy database 1000).

The program 325 may be stored in a compressed, uncompiled and/or encrypted format. The program 325 furthermore includes program elements that may be necessary, such as an operating system, a database management system and "device drivers" used by the processor 320 to interface with peripheral devices. Appropriate device drivers and other necessary program elements are known to those skilled in the art and are not described in detail herein.

Note that the processor 320 and the storage device 330 may be, for example: (i) located entirely within a single computer or other computing device; or (ii) connected by a remote communication medium, such as a serial port cable, telephone line or wireless frequency transceiver. In one embodiment, the purchasing system device 300 may comprise one or more computers that are connected to a remote database server.

Note that, as used herein, information may be "received" by, for example: (1) the purchasing system device 300 from a buyer device 200 or a retailer device 400; or (2) a software application or module within the purchasing system device 300 from another software application, module or any other source.

As shown in FIG. 3, the storage device 330 also stores an accepted offer database 900 and the product subsidy database 1000, which are described in detail with respect to FIG. 9 and 10, respectively. The schematic illustrations and accompanying descriptions of the databases presented herein are exemplary, and any number of other database arrangements could be employed besides those suggested by the figures.

Retailer Device

Figure 4:
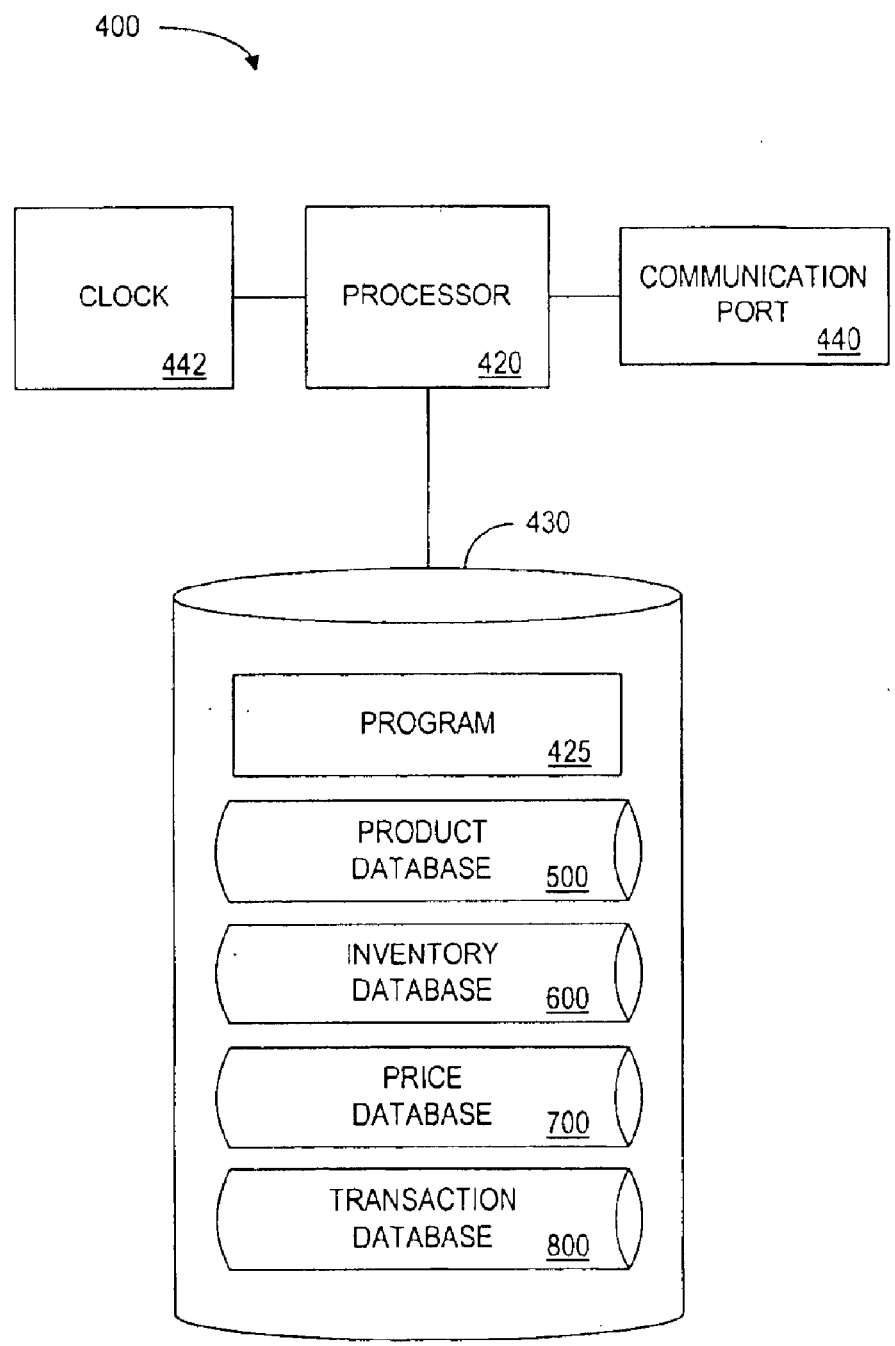
FIG. 4 is a block schematic diagram of a retailer device according to an embodiment of the present invention.

FIG. 4 illustrates a retailer device 400 that is descriptive of the retailer device 400 shown in FIGS. 1A and 1B according to an embodiment of the present invention. The retailer device 400 comprises a processor 420, such as one or more Pentium® processors, coupled to: a communication port 440 configured to communicate through a communication network (not shown in FIG. 4); and a clock 442 (such as a clock that provides the retailer device 400 with the current date and time). The communication port 440 may be used to communicate with, for example, a purchasing system device 300 to let a retailer provide a substitute product to a buyer. According to another embodiment of the present invention, the communication port 440 may communicate with a buyer device 200 to let a retailer provide a substitute product to a buyer.

The processor 420 is also in communication with a storage device 430. The storage device 430 may comprise any appropriate storage device, including combinations of magnetic storage devices (e.g., a hard disk drive), optical storage devices, or semiconductor memory, such as RAM and ROM.

The storage device 430 stores a program 425 for controlling the processor 420. The processor 420 performs instructions of the program 425, and thereby operates in accordance with the present invention. As will be described, the processor 420 may receive product redemption information from a buyer, the product redemption information enabling the buyer to take possession of a first product purchased by the buyer through a purchasing system. In addition, the processor 420 may determine a substitute product, different than the first product, to provide to the buyer (e.g., by locally determining the substitute product or by receiving substitute product information from the purchasing system device 300).

The program 425 may be stored in a compressed, uncompiled and/or encrypted format. The program 425 furthermore includes program elements that may be necessary, such as an operating system, a database management system and "device drivers" used by the processor 420 to interface with peripheral devices. Appropriate device drivers and other necessary program elements are known to those skilled in the art and are not described in detail herein.

Note that the retailer device 400 may comprise, for example, POS devices, such as a POS controller that communicates with one or more POS terminals or kiosks and the purchasing system device 300 during the redemption process. A POS terminal may include an optical bar code scanner (to read bar codes on products or vouchers) and a card reader (to read cards, such as cards that have magnetizable strips on which data can be recorded). One such card reader is the OMNI™ 1450 payment terminal, manufactured by VeriFone, Inc., which includes a built-in, magnetic-stripe reader, a Personal Identification Number (PIN) entry pad (e.g., one used buy a buyer to enter a debit card PIN) and an integrated smart card reader. The retailer device 400 may also include inventory systems that periodically update the purchasing system device 300. Moreover, in an embodiment in which a buyer's PDA communicates with the retailer device 400, the retailer device 400 may also include, for example, an Infra-Red (IR) communication port.

As shown in FIG. 4, the storage device 430 also stores: a product database 500 (described in detail with respect to FIG. 5); an inventory database 600 (described in detail with respect to FIG. 6); a price database 700 (described in detail with respect to FIG. 7); and a transaction database 800 (described in detail with respect to FIG. 8). Note that some or all of these databases may instead be stored at the purchasing system device 300 (e.g., when the purchasing system device 300 determines the substitute product).

The retailer device 400 receives product redemption information (e.g., a redemption code printed on a voucher) from a buyer, and verification of the product redemption information enables the retailer to authorize the buyer to take possession of a first product, purchased by the buyer through a purchasing system, at the retailer.

As will now be described, according to an embodiment of the present invention the retailer device 400 determines a substitute product (different than the first product) to provide to the buyer and provides the substitute product to the buyer in place of the first product.

As used herein, the retailer device 400 may "determine" a substitute product by locally determining a particular substitute product. In this case, the retailer device 400 may send a request for approval of the substitute product to the purchasing system device 300. In addition, the retailer device 400 may need to receive additional information from the purchasing system device 300 (e.g., buyer offer information or a payment amount the retailer would receive or be expected to provide based on the sale of a substitute product). According to another embodiment of the present invention, the retailer device 400 determines a substitute product by asking the purchasing system device 300 to determine a substitute product.

The determination of a substitute product may be based at least in part on the product redemption information. The product redemption information may identify the first product, and the retailer device 400 may compare an identifier associated with the first product and a set of identifiers associated with acceptable substitute products. For example, the determination may be based at least in part on: (i) a UPC identifier associated with the first product; (ii) a Stock Keeping Unit (SKU) number associated with the first product; or (iii) a manufacturer associated with the first product.

The determination may also be based at least in part on a settlement price the retailer has agreed to accept in exchange for providing the first product. According to another embodiment of the present invention, the determination may be based at least in part on a settlement price the retailer has agreed to accept in exchange for providing the substitute product. Similarly, the determination may be based at least in part on a price the buyer has agreed to provide to the purchasing system in exchange for the right to take possession of the first product at the retailer.

By way of example only, consider a buyer who has arranged to purchase a 21 inch television made by a first manufacturer for $200 through the purchasing system. A retailer that purchases such a television from the first manufacturer for $150 may have an agreement with the purchasing system to provide that television to a buyer in exchange for a settlement price of $160. That is, if the retailer provides the first television to the buyer the retailer will make a profit of $10 (i.e., $160–$150). The retailer may also have a similar television made by a second manufacturer. The second television may cost the retailer $180. If the retailer can substitute this television in place of the first television (i.e., and become the seller of the second television), the retailer may receive payment of the entire buyer price ($200) from the purchasing system. In this case, the retailer would make a profit of $20 ($200–$180) and may determine that the substitute product should be offered to the buyer. Note also, however, that in an embodiment where the purchasing system rather than the manufacturer acts as the seller of the first television, the purchasing system profit would go from $40 when the first product is provided to the buyer ($200 collected form the buyer–$160 provided to the retailer) to $0 when the substitute product is provided to the buyer ($200 collected from the buyer–$200 provided to the retailer).

Depending on the agreement between the retailer and the purchasing system, the purchasing system may inform the retailer of an amount to be provided to the retailer by the purchasing system in exchange for providing the substitute product to the buyer. This amount is referred to herein as the "substitute price" and may be based on, for example: (i) the settlement price of the first product; (ii) the settlement price of the substitute product; (iii) a subsidy amount associated with the first product; (iv) the buyer price; and (v) a combination of these amounts. Such an agreement may be predetermined or may instead be determined on a transaction-by-transaction basis.

According to an embodiment of the present invention, the purchasing system may also receive a payment from the retailer in exchange for allowing the retailer to provide a substitute product to the buyer (i.e., the purchasing system may charge the retailer a fee). For example, the purchasing system may receive a percentage of the buyer's price from the retailer. According to another embodiment of the present invention, the purchasing system may instead receive a percentage of any increased profit made by the retailer because of the substitution.

The determination of a substitute product may also be based at least in part on inventory information associated with the first product or the substitute product. For example, the retailer device 400 may only offer a substitute product if the first product is not currently in stock and the substitute product is currently in stock. According to another embodiment of the present invention, a buyer may request that a substitute product be provided (e.g., by directing such a request to the retailer or the purchasing system).

The determination may also be based at least in part on sales history information associated with the first product or the substitute product. For example, the retailer device 400 may provide a poorly selling product to the buyer in place of the first product (which may be selling well). Similarly, the determination of whether a substitute product should be offered and/or what product should be offered as the substitute product may be based at least in part on, with respect to either the first product or the substitute product, one or more of: (i) an actual or forecast product demand; (ii) a product age or perishability; (iii) a product life cycle; (iv) information about a competing product; and (v) an actual or forecast profitability of the product.

According to one embodiment of the present invention, the retailer device 400 only selects a substitute product to offer to a buyer if a settlement price associated with the first product less the cost of the first product to the retailer results in an amount less than a substitute amount expected from the purchasing system as a result of the sate of the substitute product less the cost of the substitute product to the retailer (e.g., providing the substitute product to the buyer is more profitable to the retailer). In the case where the purchasing system device 300 is determining or approving a substitute product, the profitability of the substitute product to the purchasing system may be considered.

According to one embodiment of the present invention, the retailer device 400 arranges for the buyer to pay an adjusted price for the substitute product. That is, the buyer may be charged more or less than the first price the buyer originally agreed to pay through the purchasing system (e.g., an offer price or buyer price). In this case, either the retailer or purchasing system may collect the difference between the adjusted price and the first price from (or provide the difference to) the buyer.

In the embodiment of the present invention where the buyer arranges to purchase the first product by submitting a buyer offer, the determination of the substitute product may be based at least in part on said buyer offer. In this case, the retailer device 400 may need to request buyer offer information from the purchasing system device 300. For example, the retailer device 400 may select a substitute product having the exact same product category, class and features as the buyer offer. The retailer device 400 may, according to another embodiment of the present invention, determine that a product having less than the same product category, class and features can be used as a substitute product.

According to one embodiment of the present invention, the retailer device 400 presents a group of substitute product choices to the buyer, and the buyer is allowed to select the particular substitute product from the group. The purchasing system may also provide such a group to a retailer.

Examples of databases that may be used in connection with the purchasing system 10 will now be described in detail with respect to FIGS. 5 to 10.

Product Database

Referring to FIG. 5, a table 500 represents one embodiment of the product database that may be stored at either the retailer device 400, the seller device 550 or the purchasing system device 300 according to embodiments of the present invention. The table 500 includes entries 500*a*, 500*b*, 500*c*, 500*d*, 500*e* identifying products that may be sold through the purchasing system. The table 500 also defines fields 502, 504, 506, 508, 510, 512, 514 for each of the entries. The fields specify: a product identifier 502; a product descriptor 504; a product category 506; a product class 508; one or more product features 510; a minimum acceptable price 512; and one or more substitute product identifiers 514. In general, this database may be used, for example, to determine a substitute product to provide to a buyer.

The product identifier 502 may be, for example, an alphanumeric code associated with a particular product that may be sold through the purchasing system, and may or may not be based on product identifiers 602, 702, 806, 902 stored in other databases. When the retailer device 400 or purchasing system device 300 is to determine a substitute product, the product identifier 502 associated with the first product is located. The list of substitute product identifiers 514 can then be used to select one or more appropriate substitute products.

In another embodiment of the present invention, a substitute product is determined based on the product category 506, the product class 508 and one or more product features 510. For example, a substitute product having the same product category as the first product, the same product class as the first product and two out of three product features of the first product may be selected as a substitute product to be offered to the buyer.

For each product associated with the product identifier 502, the product database 500 stores the associated product category 506 (e.g., televisions or VCRs), product class 508 (e.g., class "I" consisting of one group of product manufacturers, class "II" consisting of another group of product manufacturers, etc.), and one or more product features 510 (e.g., a remote control or picture-in-picture capability).

In one embodiment, the minimum acceptable price 512 of a potential substitute product can be compared to the buyer price (e.g., a price the buyer agreed to provide in exchange for the product) to determine if the substitute product can be offered to the buyer. Consider a buyer who has arranged to purchase a product having a product identifier 502 of "TV-0155" from the purchasing system for $600. Based one the substitute product identifier 514 associated with entry 500*b*, the product having a product identifier 502 of "TV-0154" might be selected as a substitute product. However, because the minimum acceptable price 512 associated with "TV-0154" is $650 (i.e., more than the buyer price of $600) as shown in entry 500*a*, "TV-0154" may not be selected as a substitute product for that particular buyer (although "TV-0154" be selected as a substitute product for another buyer who arranged to purchase "TV-0155" from the purchasing system for $675).

Inventory Database

Referring to FIG. 6, a table 600 represents one embodiment of the inventory database that may be stored at either the retailer device 400 or the purchasing system device 300 according to embodiments of the present invention. The table 600 includes entries 600*a*, 600*b*, 600*c*, 600*d*, 600*e* identifying products sold through the purchasing system. The table 600 also defines fields 602, 604 for each of the entries. The fields specify: a product identifier 602; and an amount in inventory 604. In general, this database may be used, for example, to determine if a substitute product should be determined and whether or not a potential substitute product will be offered to the buyer.

The product identifier 602 may be, for example, an alphanumeric code associated with a particular product. When a buyer attempts to redeem a voucher for a first product the amount in inventory 604 associated with the first product's product identifier 602 may be accessed (e.g., the substitute product will only be determined if the amount in inventory 604 is zero). Similarly, when a potential substitute product is determined, the amount in inventory 604 may be accessed to determine if that product will be offered to the buyer (e.g., a product will not be offered as a substitute product if the amount in inventory 604 is zero).

Price Database

Referring to FIG. 7, a table 700 represents one embodiment of the price database that may be stored at either the retailer device 400 or the purchasing system device 300 according to embodiments of the present invention. The table 700 includes entries 700a, 700b, 700c, 700d, 700e identifying a product sold through the purchasing system. The table 700 also defines fields 702, 704, 706, 708 for each of the entries. The fields specify: a product identifier 702; a retail price 704; a cost 706; and a settlement price 708. In general, this database may be used, for example, to determine which products may be offered to a buyer as a substitute product.

The product identifier 702 may be, for example, an alphanumeric code associated with a particular product sold through the purchasing system. The price database 700 may be used, for example, to determine if a substitute product is more profitable to the retailer as compared to the first product. For example, if the retailer will only receive from the purchasing system the settlement price of the first product (even when a substitute product is provided to the buyer), the retailer may decide to only offer a substitute product if the cost 706 associated with the substitute product (as determined by the product identifier 702) is less than or substantially equal to the cost 706 associated with the first product. Of course, other factors (e.g., sales history and inventory information) may encourage the retailer to offer a substitute product to a buyer even when the cost 706 of the substitute product is more than the cost 706 associated with the first product.

Similarly, the settlement price 708 may be a factor if the retailer will receive the settlement price of the substitute product when the substitute product is provided to the buyer. For example, the retailer may compare (i) the settlement price of the substitute product minus the cost of the substitute product with (ii) the settlement price of the first product minus the cost of the first product. In an embodiment where the retailer receives the buyer's price when the substitute product is provided to the buyer, the settlement price of the first product minus the cost of the first product may be compared to the buyer's price minus the cost of the substitute product to determine relative profitability. Note that according to one embodiment of the present invention, the settlement price 708 may be retailer specific (e.g., a number of different settlement prices 708 and associated retailers may be stored in the price database 700).

Transaction Database

Referring to FIG. 8, a table 800 represents one embodiment of the transaction database that may be stored at the retailer device 400 according to an embodiment of the present invention. The table 800 includes entries 800a, 800b, 800c, 800d, 800e identifying a particular purchasing system transaction. The table 800 also defines fields 802, 804, 806, 808, 810, 812, 814 for each of the entries. The fields specify: a transaction identifier 802; a redemption code 804; a first product identifier 806; a first product status 808; a substitute product identifier 810; an expected payment amount 812; and a payment status 814. In general, this database may be used, for example, to store information related to a purchasing system transaction.

The transaction identifier 802 may be an alphanumeric code that identifies a particular purchasing system transaction. The redemption code 804 may be an alphanumeric code associated with the purchasing system transaction (including, for example, a payment identifier or a buyer defined redemption code). The first product identifier 806 may be an alphanumeric code associated with a product associated with the redemption code 804. The first product status 808 indicates whether the buyer has not yet taken possession of a product ("pending"), has taken possession of the first product ("redeemed") or has taken possession of a substitute product ("switched"). The substitute product identifier 810 identifies the substitute product (when applicable). The expected payment amount 812 and the payment status reflect the amount the retailer expects to receive in exchange for provide either the first product or the substitute product to the buyer and the status of such payment (e.g., "paid" or "pending"), respectively.

Accepted Offer Database

Referring to FIGS. 9A and 9B, a table 900 represents one embodiment of the accepted offer database that may be stored at the purchasing system device 300 according to an embodiment of the present invention. The table 900 includes entries 900a, 900b, 900c identifying particular purchasing system transactions. The table 900 also defines fields 902, 904, 906, 908, 910, 912, 914, 916, 918, 920, 922, 924, 926, 928, 930, 932 for each of the entries. The fields specify: an offer identifier 902; a redemption code 904; a buyer identifier 906; a first product identifier 908; a buyer's price 910; a first product status 912; a first subsidy amount 914; authorized retailer identifier 916; a redemption retailer identifier 918; an amount owed to retailer 920; a substitute product identifier 922; a buyer's substitute price 924; a substitute subsidy amount 926; an offer product category 928; an offer product class 930; and one or more offer product features 932. In general, this database may be used, for example, to store information related to a purchasing system transaction.

The offer identifier 902 may be an alphanumeric code that identifies a particular purchasing system transaction, and the redemption code 904 may be an alphanumeric code associated with that transaction (including, for example, a payment identifier and/or a buyer defined redemption code). Note that there may be more than one redemption code associated with each transaction identifier (e.g., a new redemption code may be issued to a buyer who has lost a redemption code or to a buyer who has arranged to accept a substitute product in place of a first product).

The buyer identifier 906 and the first product identifier 908 may be alphanumeric codes associated with a particular buyer and a first product, respectively. The buyer's price 910 is an amount based on the price the buyer has agreed to provide in the transaction (e.g., in exchange for the right to take possession of the first product at a retailer) and the subsidy amount 914 is an amount based on an amount a party may be willing to contribute towards the buyer's purchase of a first product. As used herein, a "subsidy" amount may be, for example, provided by a manufacturer, a seller or any other subsidy provider. Note that a subsidy amount may also be, for example, associated with a particular product, a particular buyer or a particular manufacturer.

The status 912 of the transaction may be initialized to "pending" and updated to "redeemed" or "switched" when the buyer takes possession of either the first product or the substitute product, respectively.

The authorized retailer identifiers field 916 lists one or more retailers at which the buyer may take possession of the first product and the redemption retailer identifier 918 indicates the retailer at which the buyer actually took possession of either the first product or the substitute product. In the case of a substitute product, the substitute product identifier 922, the buyer's substitute price 924 and the substitute subsidy amount 926 may all be updated with the appropriate information with respect to the substitute product. The amount owed to retailer 920 indicates an amount the purchasing system may need to provide to the retailer in exchange for providing either the first product or the substitute product to the buyer.

For each offer associated with the offer identifier 902, the accepted offer database 900 also stores the associated offer product category 928, offer product class 930, and one or more offer product features 932. This information may be used, for example, to determine a substitute product (e.g., a substitute product having the same product category, class and features as the buyer offer) to offer to the buyer. According to one embodiment of the present invention, a substitute product having a different product, category, class or features (e.g., a product upgrade) as compared to the buyer's offer may be offered to the buyer instead.

Note that the buyer's substitute price 924 may be different than the buyer's price 910 associated with the original offer (i.e., the buyer may have to pay more than or less than the buyer's price associated with the original offer), as shown in record 900a, or the buyer's substitute price may be the same as the buyer's price 910 associated with the original offer, as shown in record 900c. If the buyer's substitute price 924 is different than the buyer's price 910 associated with the original offer, the difference may be exchanged between, for example, the buyer and: (i) the purchasing system; (ii) the retailer; or (iii) the seller. For example, the buyer may provide the buyer's price to the purchasing system when arranging to take possession of the first product and then provide an additional amount to the retailer when taking possession of the substitute product.

The first subsidy amount 914 is an amount that a subsidy provider is contributing to the transaction associated with the offer identifier 902. However, subsidies may also be associated with, for example, a specific: product, product manufacturer, or buyer. Consider a first product subsidy amount associated with a first product. In this case, when a buyer takes possession of a substitute product a different subsidy amount, associated with the substitute product, may be applied to the transaction as shown in entry 900a. In the case of a first product subsidy amount associated with the buyer, the same subsidy amount may be applied to both the original transaction (i.e., the buyer arranging to take possession of the first product) and a substitute transaction (i.e., the buyer taking possession of the substitute product) as shown in entry 900c.

By way of example, a manufacturer may provide a purchasing system with a $5,000 subsidy to sell 100 televisions. The purchasing system may then apply, for example, $50 to each offer associated with those television. According to another embodiment of the present invention, the purchasing system may apply different amounts to different transactions (e.g., $20 towards a first transaction, $100 towards a second transaction and nothing towards a third transaction), such as only the amounts required to complete each transaction.

Product Subsidy Database

Referring to FIG. 10, a table 1000 represents one embodiment of a record in the product subsidy database, representing a product available through the purchasing system. According to one embodiment of the present invention, the record may be stored at the purchasing system device 300. The table 900 defines fields 1002, 1004, 1006, 1008, 1010 for each record (i.e., for each product). The fields specify: a product identifier 1002; a subsidy amount 1004; a subsidy provider 1006; a retailer identifier 1008; and a settlement price 1010. In general, this database may be used, for example, to store subsidy amounts and other information related to a product available through the purchasing system.

The product identifier 1902 may be an alphanumeric code that identifies a particular product available through the purchasing system and may be related to the product identifiers 502, 602, 702, 806, 810, 908, 922 described herein. The subsidy provider 1006 may be an alphanumeric code that identifies a party that is willing to contribute a subsidy amount 1004 towards the purchase of a product through the purchasing system. For example, subsidy provider "SP-101" is willing to contribute $25.00 towards the sale of each product associated with product identifier "TV-0154."Note that subsidies for a single product may be available from a number of different subsidy providers. Subsidies may also be available that are not associated specifically with a sale of a single product (e.g., the subsidies may be associated with a particular buyer or with a total number of products sold).

The product subsidy database 1000 also stores a number of retailer identifiers 1008. A retailer identifier 1008 may be, for example, an alphanumeric code that identifies a retailer from which the product associated with the product identifier 1002 is available. For each retailer identifier 1008, an associated settlement price 1010 is also stored in the product subsidy database 1000.

Methods that may be used in connection with the system 10 according to an embodiment of the present invention will now be described in detail with respect to FIGS. 1A to 17.

Substitute Product Methods

Figure 11A:
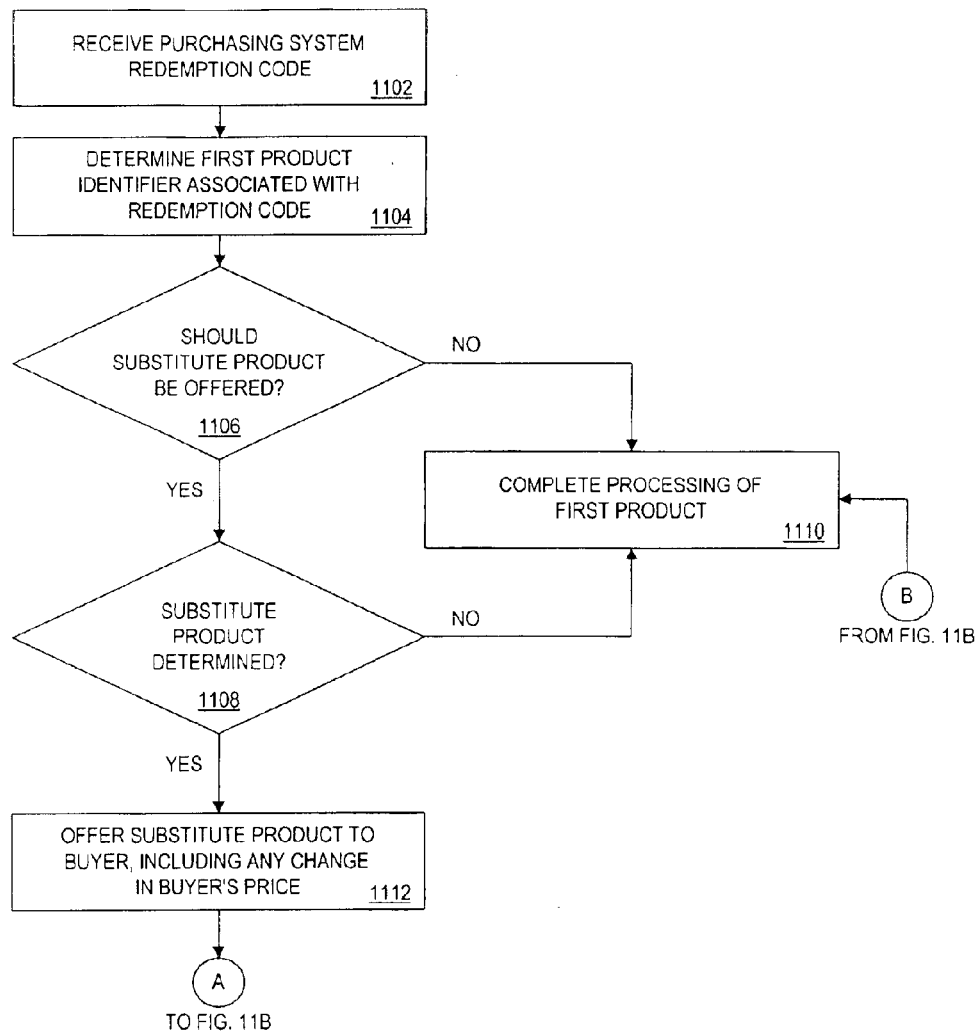
FIGS. 11A and 11B are flow charts illustrating a method wherein a retailer provides a substitute product to a buyer according to an embodiment of the present invention.
Figure 11B:
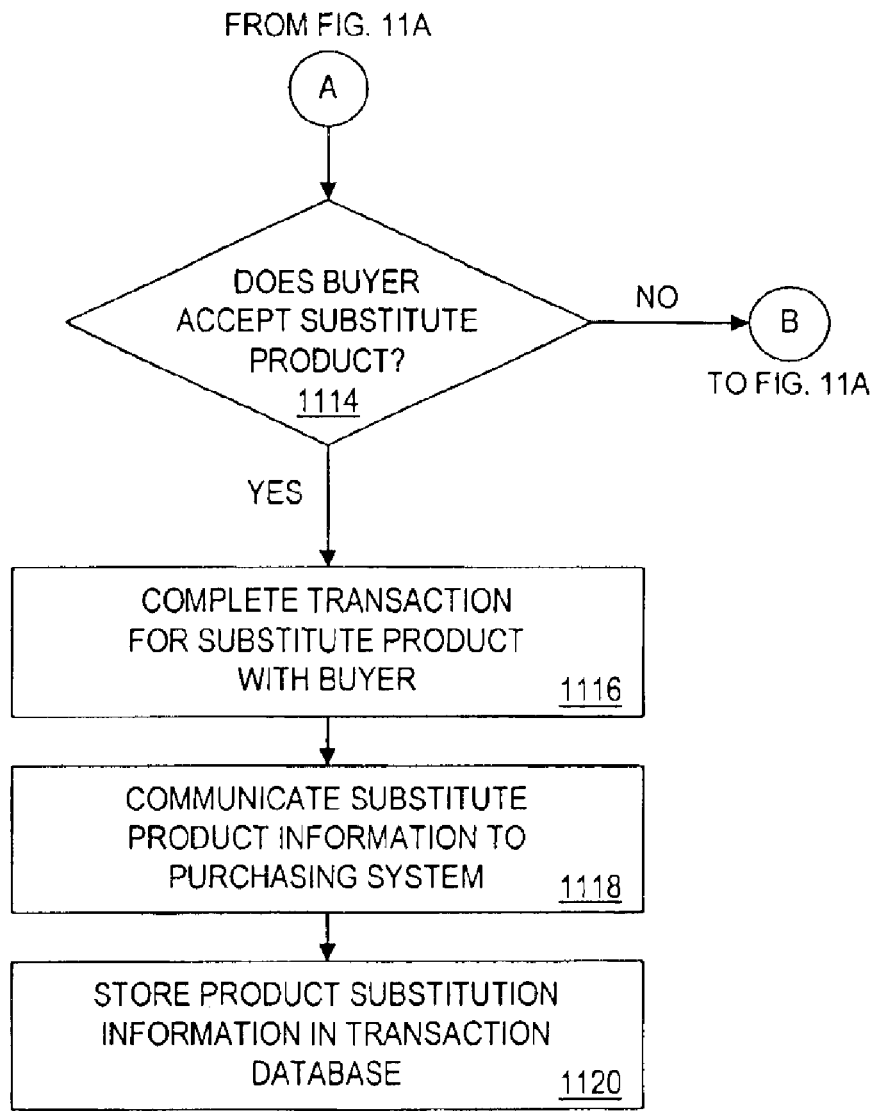

FIGS. 11A and 11B are flow charts illustrating a general method wherein a retailer provides a substitute product to a buyer according to an embodiment of the present invention. The flow chart in FIG. 11A and 11B, as well as the other flow charts discussed herein, is not meant to imply a fixed order to the steps, and embodiments of the present invention can be practiced in any order that is practicable.

At 1102, a purchasing system redemption code is received by the retailer. At 1104, the first product identifier associated with the redemption code is determined. It is then decided if a substitute product should be offered to the buyer at 1106 (e.g., if the product is not in stock, if the buyer has requested a substitute product, if a substitute product may create more profit). If a substitute product should not be offered to the buyer at 1106, the processing of the first product is completed at 1110 (e.g., the buyer takes possession of the first product at the retailer).

If a substitute product should be offered to the buyer at 1106, an appropriate substitute product is determined at 1108. This may be based on, for example, current inventory or revenue management information and may require that the retailer communicate with the purchasing system device 300. Various method of determining a substitute product (including deciding whether or not a substitute product should be or can be offered) are described in FIGS. 12 to 17.

If an appropriate substitute product cannot be determined at 1108, the processing of the first product is completed at 1110. This processing may simply comprise, for example, informing the buyer that the first product is not currently in stock. In this case, the buyer may have to return to the retailer at a later time or visit another retailer.

If an appropriate substitute product is determined at 1108, the substitute product is offered to the buyer at 1112, including any change in the buyer's price. For example, an employee of the retailer may be prompted to offer the substitute product to the buyer, or an offer may appear at the POS for the buyer to read. If the buyer does not accept the substitute product at 1114, the processing of the first product is completed at 1110.

If the buyer accepts the substitute product at 1114, the transaction is completed using the substitute product in place of the first product at 1116. At 1118, substitute product information is provided to the purchasing system device 300. The appropriate record in the transaction database 800 is then updated to reflect the substitution at 1120 (e.g., by updating the first product identifier 806, the first product status 810 to "switched" and, if appropriate, the expected payment amount 812).

Figure 12:
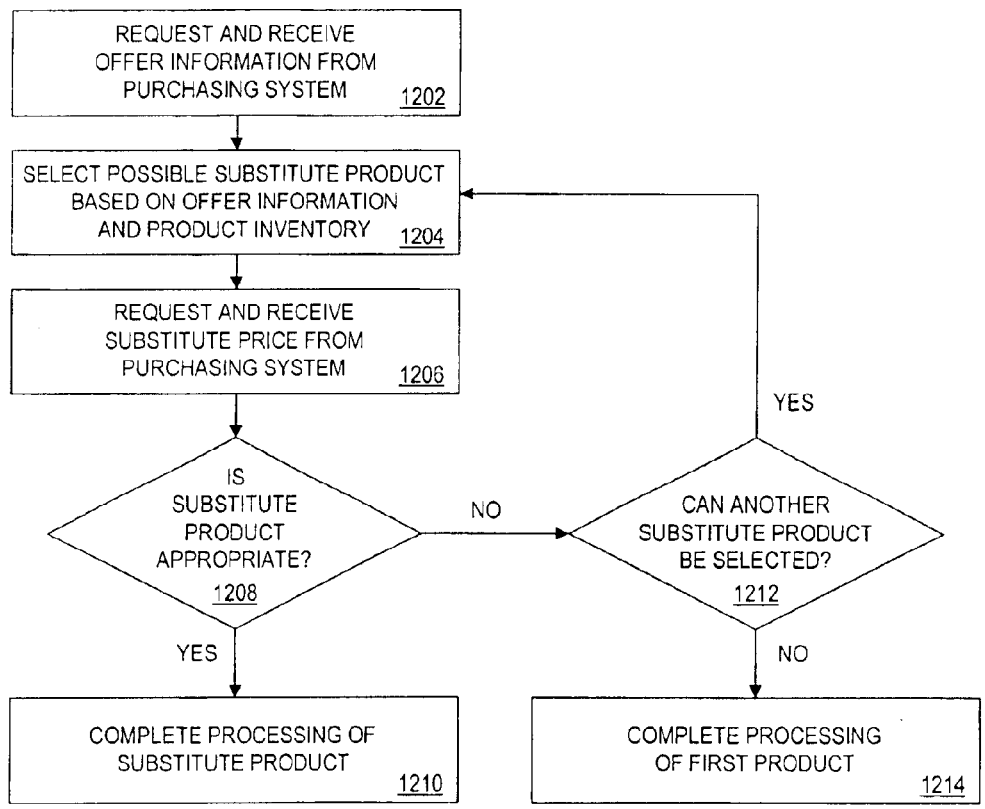
FIG. 12 is a flow chart illustrating a retailer method of determining a substitute product according to one embodiment of the present invention.

FIG. 12 is a flow chart illustrating a method of determining a substitute product according to one embodiment of the present invention. This method, which is associated with element 1108 shown in FIG. 11A, may be performed, for example, locally by a retailer to determine a substitute product based on information received from a purchasing system. At 1202, the retailer requests and receives offer information from the purchasing system, such as, for example, the offer product category, the offer product class and the offer product features. The retailer may request this information, for example, by sending a redemption code associated with a transaction to the purchasing system. Based on the offer information and the inventory of the retailer, a possible substitute product is selected at 1204. For example, a product having a related product category, class and/or features (e.g., the same product category, the same product class, and two out of three product features as stored in the product database 500 with respect to the possible substitute product) may be selected as a possible substitute product if the substitute product is currently in stock.

At 1206, the retailer requests and receives a substitute price from the purchasing system (e.g., by transmitting a substitute product identifier to the purchasing system) and determines, at 1208, whether or not the substitute product is appropriate to offer to the buyer. For example, a substitute product may not be appropriate if the substitute price received from the purchasing system would result in an unacceptable profit (or even a loss) for the retailer. If the substitute product is appropriate at 1208, the processing of the substitute product continues at 1210 (e.g., by offering the substitute product to the buyer as described with respect to 1112 in FIG. 10A).

If the substitute product is not appropriate at 1208, the retailer determines whether or not another substitute product can be selected at 1212. If another substitute product may be selected at 1212, the process continues at 1204. If another substitute product cannot be selected (e.g., when the retailer does not have a product in inventory that can be substituted for the first product) the processing of the first product is completed at 1214 (e.g., as described with respect to 1010 in FIG. 10A).

Figure 13:
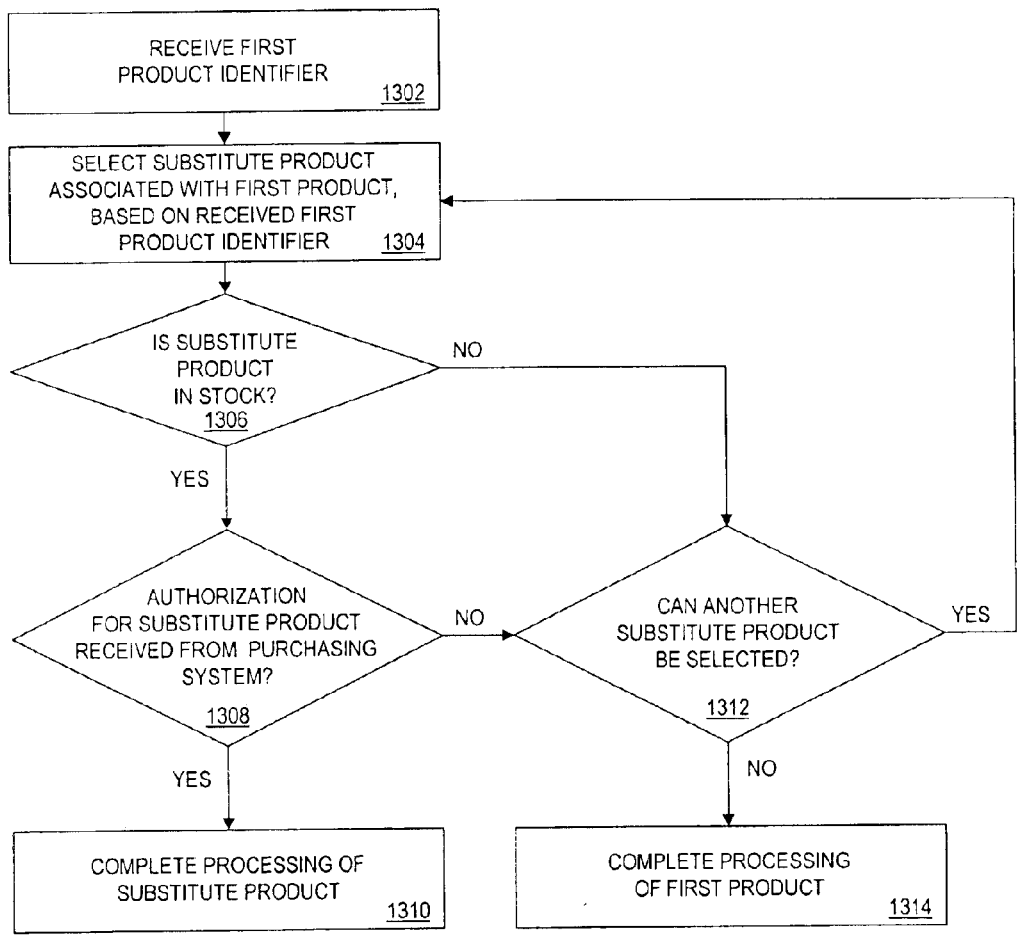
FIG. 13 is a flow chart illustrating a retailer method of determining a substitute product according to one embodiment of the present invention.

FIG. 13 is a flow chart illustrating a method of determining a substitute product according to another embodiment of the present invention. This method, which is associated with element 1108 shown in FIG. 11A, may be performed, for example, locally by a retailer to determine a substitute product based on information received from a purchasing system. At 1302, the retailer receives a first product identifier associated with the first product. Based on the first product (e.g., as indicated by the received first product identifier), a substitute product associated with the first product is selected at 1304. This may be done, for example, using the substitute product identifiers 514 stored in the product database 500.

At 1306, the retailer determines if the substitute product is currently in stock. If the product is currently in stock at 1306, and authorization for the substitute product is received from the purchasing system at 1308, the processing of the substitute product continues at 1310 (e.g., by offering the substitute product to the buyer as described with respect to 1112 in FIG. 11A).

If either the substitute product is not currently in stock at 1306 or authorization for the substitute product is not received from the purchasing system at 1308 (e.g., the purchasing system sends an "authorization denied" signal), the retailer determines if another substitute product can be selected at 1312. If another substitute product can be selected at 1312, the process continues at 1304 (i.e., the retailer selects another substitute product). If another substitute product cannot be selected at 1312, the processing of the first product is completed at 1314 (e.g., as described with respect to 1110 in FIG. 11A).

Figure 14:
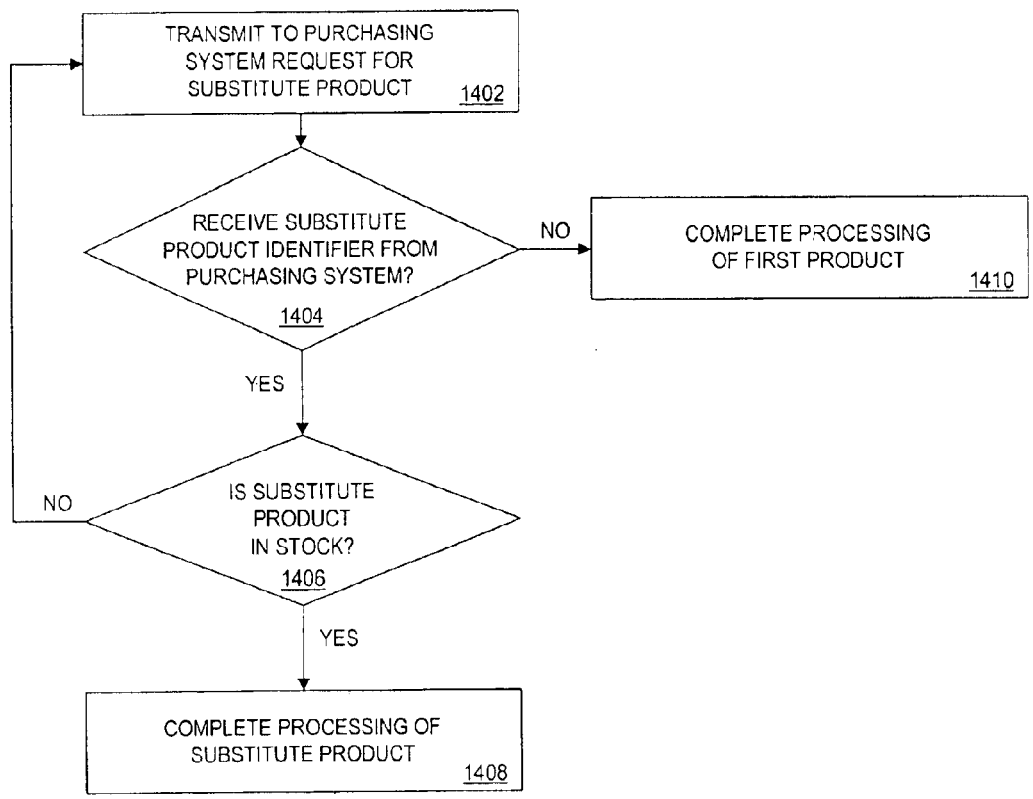
FIG. 14 is a flow chart illustrating a retailer method of determining a substitute product according to one embodiment of the present invention.

FIG. 14 is a flow chart illustrating a method of determining a substitute product according to still another embodiment of the present invention. This method, which is associated with element 1108 shown in FIG. 11A, may be performed, for example, locally by a retailer to determine if a substitute product selected by the purchasing system can be offered to the buyer. According to this embodiment, the retailer may not consider the profitability of the substitute product when making this determination. At 1402, the retailer transmits to the purchasing system a request for a substitute product, and the purchasing system may respond by providing a substitute product identifier to the retailer at 1404.

If the purchasing system responds by providing a substitute product identifier to the retailer at 1404, the retailer determines if the substitute product associated with the received substitute product identifier is currently in stock at 1406. If the substitute product is currently in stock at 1406, the processing of the substitute product continues at 1408 (e.g., by offering the substitute product to the buyer as described with respect to 1112 in FIG. 11A).

If the purchasing system does not responds by providing a substitute product identifier to the retailer at 1404 (e.g., the purchasing system indicates that no other product may be substituted for the first product), the processing of the first product is completed at 1410 (e.g., as described with respect to 1110 in FIG. 11A).

Figure 15:
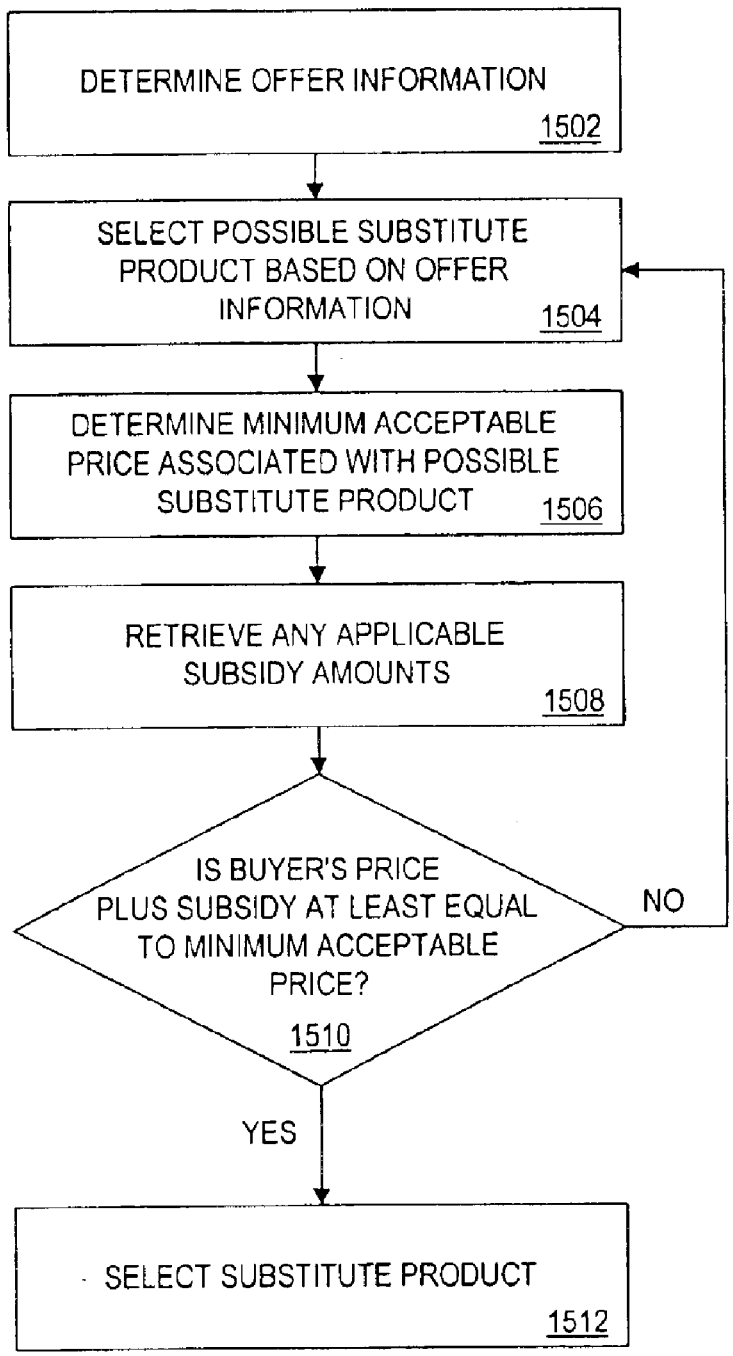
FIG. 15 is a flow chart illustrating a purchasing system method of determining a substitute product according to one embodiment of the present invention.

FIG. 15 is a flow chart illustrating a method of determining a substitute product that may be performed by the purchasing system according to another embodiment of the present invention. This method may be performed, for example, when a buyer offer is first accepted. The method may be performed, for example, to store an approved substitute product identifier 512 in the product database 500 stored at one or more retailer devices 400, to include information identifying the substitute product in redemption information to be provided to the retailer (e.g., to print the approved substitute product identifier 512 on a voucher), or to store the approved substitute product identifier 512 in the accepted offer database 900 until a request for a substitute product is received from a retailer or when the buyer visits a retailer to take possession of a product (e.g., in response to a request sent from a retailer device 400 to the purchasing system device 300).

At 1502, the buyer offer information is determined. This may be done by accessing the buyer's price 910, the offer product category 928, the offer product class 930 and the offer product features 932 stored in the accepted offer database 900. Based on the offer information, a possible substitute product is selected at 1504. For example, the purchasing system may select a product with the same product class and category as a possible substitute product. The product features associated with the buyer's offer and the possible substitute product may also be compared (e.g., looking for an exact or partial match).

At 1506, the minimum acceptable price associated with the possible substitute product is determined. The purchasing system also retrieves any applicable subsidy amounts associated with the possible substitute product at 1508, including, for example, subsidies that are buyer, retailer, product or manufacturer specific (e.g., by accessing information in the product subsidy database 1000). The minimum acceptable price and/or the subsidy amounts may be obtained, for example, by accessing a database stored at the purchasing system device 300 or by communicating with a seller device 550 or a subsidy provider device.

At 15 10, the purchasing system compares (i) the buyer's price 910 associated with the offer plus any subsidy amount applicable to the first product and (ii) the minimum acceptable price associated with the possible substitute product. If the buyer's price plus any applicable subsidy amount is less than the minimum acceptable price at 1510, another possible substitute product is selected at 1504. Of course, if no other possible substitute product is available, the purchasing system is unable to select a substitute product.

If the buyer's price plus any applicable subsidy amount is at least equal to the minimum acceptable price at 1510, the possible substitute product is selected as the substitute product at 1512. An identifier associated with the substitute product can then, for example, be stored in a retailer product database 500 or transmitted to a retailer device 400 as appropriate.

According to an embodiment of the present invention, a number of acceptable substitute products may be determined. One or more of the acceptable products may then be selected (e.g., by the purchasing system, the retailer, the seller or the buyer) based on, for example, the relative profitability of the first product and each of the acceptable substitute products.

Figure 16A:
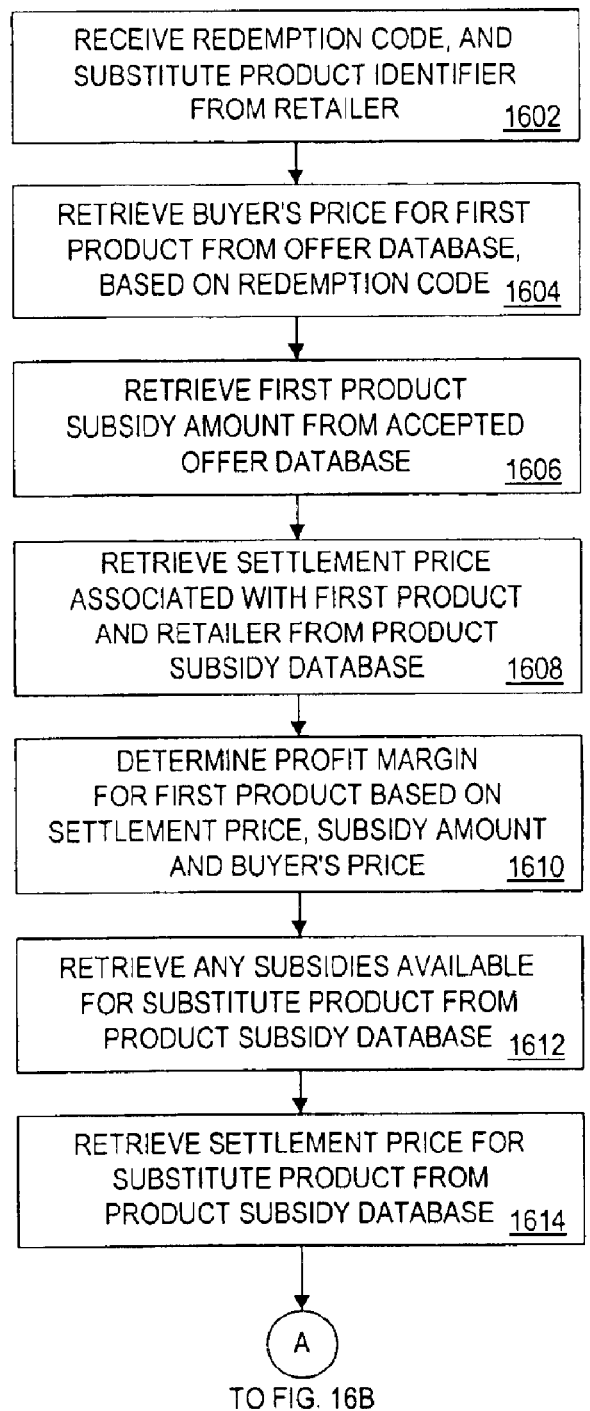
FIGS. 16A and 16B are a flow chart illustrating a purchasing system method of determining a substitute product according to one embodiment of the present invention.
Figure 16B:
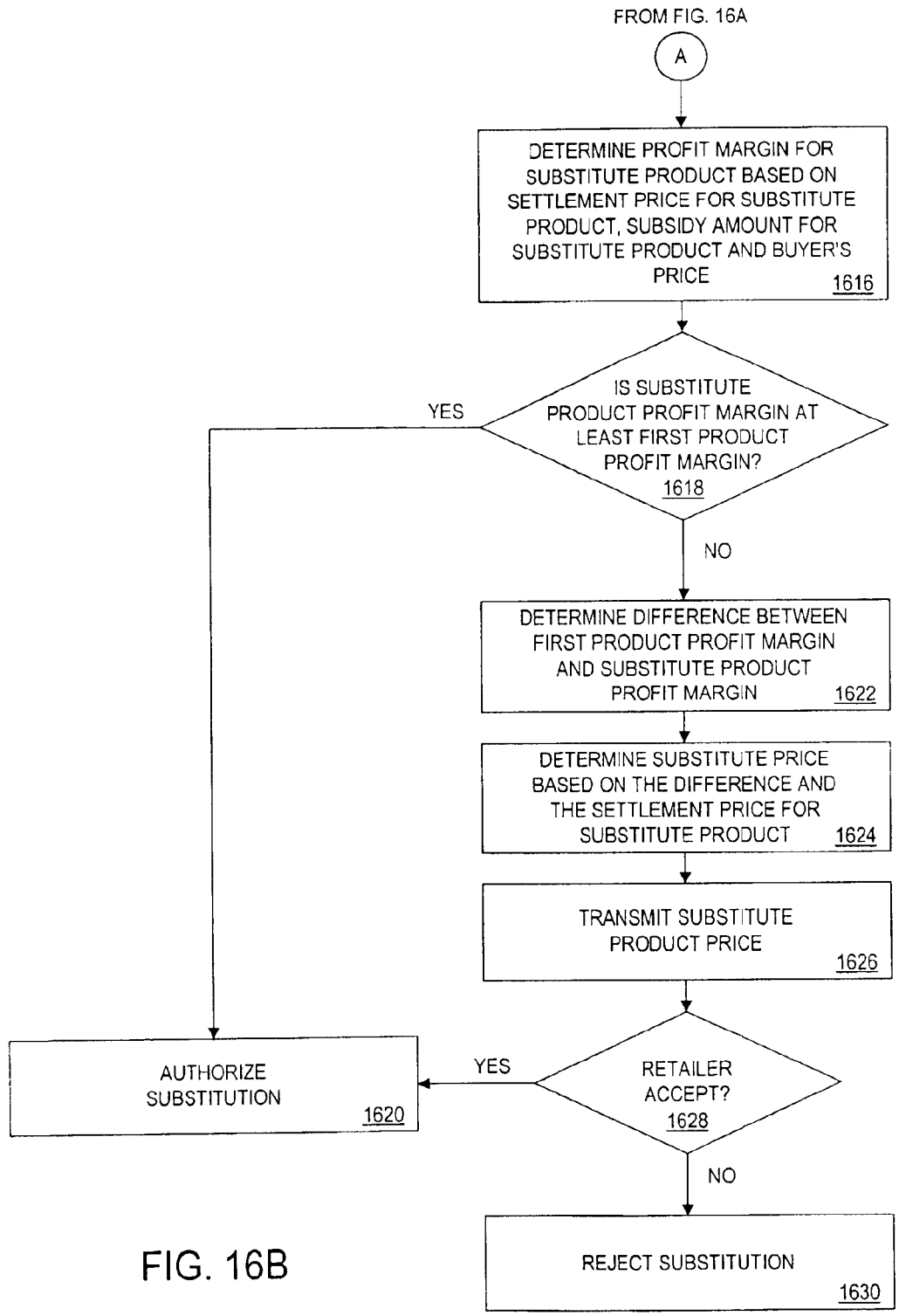

FIGS. 16A and 16B are a flow chart illustrating a method of determining a substitute product as may be performed by the purchasing system according to another embodiment of the present invention. According to this embodiment, the purchasing system verifies a retailer's substitute product selection. At 1602, the purchasing system receives a redemption code and substitute product identifier from a retailer. Using the redemption code, the buyer's price 910 for the first product is retrieved from the accepted offer database 900. The first product subsidy amount 914 associated with the first product is also retrieved from the accepted offer database 900 at 1606. At 1608, the settlement price associated with the first product and the retailer is retrieved (e.g., from the product subsidy database 1000 stored at the purchasing system device 300).

Using this information, the purchasing system determines the profit margin for the first product at 1610. For example, the profit margin for the first product may be based on the buyer's price 910 plus the first subsidy amount 914 less the settlement price associated with the first product.

At 1612 and 1614, the purchasing system retrieves any subsidy amounts and settlement prices available for the substitute product associated with the substitute product identifier received from the retailer (e.g., from the product subsidy database 1000 stored at the purchasing system device 300). The profit margin for the substitute product can then be determined at 1616, such as by calculating the buyer's price 910 plus the subsidy amount 1004 associated with the substitute product less a settlement price 1010 associated with the substitute product.

If the substitute product profit margin is at least equal to the first product profit margin at 1618, the purchasing system authorizes the substitution at 1620 (e.g., by transmitting an authorization message to the retailer device 400).

If the substitute product profit margin is less than the first product profit margin at 1618, the purchasing system determines the difference between the first product profit margin and the substitute product profit margin at 1622. A substitute price, based on the difference between the first product profit margin and the substitute product profit margin, is then determined at 1624.

In general, the substitute price may represent, for example, an amount necessary to provide the purchasing system with an acceptable profit. For example, the substitute price may represent an amount necessary to provide the purchasing system with a profit that is at least equal to the profit the purchasing system would have made if the buyer had taken possession of the first product. Note that the substitute price may be an amount that is to be provided from the retailer to the purchasing system or from the purchasing system to the retailer.

In the case where a buyer provides the buyer's price to the purchasing system when arranging to take possession of the first product (and the purchasing system is to provide the retailer with a first settlement price in exchange for providing the first product to the buyer), the substitute price may be based on, for example, the settlement price of the substitute product adjusted so that the purchasing system will receive the same profit it would have received if the buyer took possession of the first product. According to one embodiment of the present invention, the substitute price may simply be the first settlement price.

Consider, for example, a buyer who arranges to purchase a first television through the purchasing system for $90, where the purchasing system is to receive a $20 S product-specific subsidy from a third party and the retailer has agreed to accept a $100 settlement price for the first television. In this case, the purchasing system can expect to make a profit of $10 on the transaction ($90+$20−$100). If the buyer arranges to take possession of a substitute television, with no associated subsidy, the purchasing system may only provide a substitute price of $80, regardless of any previously established settlement price associated with the substitute product, for the substitute television to the retailer so that the purchasing system will still make a profit of $10 ($90−$80).

In the case where a buyer provides the buyer's price to the retailer when taking possession of the first product (and the retailer is to provide the purchasing system with the difference between the buyer's price and the first settlement price), the substitute price may be based on, for example, the profit the purchasing system would have received if the buyer took possession of the first product. Consider the above example where the purchasing system expected to make a profit of $10 on the transaction. If the buyer arranges with a retailer to take possession of a substitute television, the purchasing system may require payment of a substitute price of $10 from the retailer.

An amount associated with the substitute product price is transmitted to the retailer at 1626. Consider, for example, a retailer that wants to offer a substitute product that has, with respect to the purchasing system, a $10 substitute product profit margin in place of a first product that has a $20 first product profit margin. In this case, the purchasing system may decrease the normal settlement price of the substitute product by $10 to maintain the profit margin. In this case, the decreased settlement price is the substitute price and is an example of a substitute price determination based on the settlement price.

The retailer can then decide if the substitute product should be offered to the buyer based on the revised settlement price for the substitute product. If at 1628, the retailer accepts the revised settlement price, the substitution is authorized at 1620. If, on the other hand, the retailer does not accept the revised settlement price at 1628, the substitution is rejected at 1630.

Figure 17:
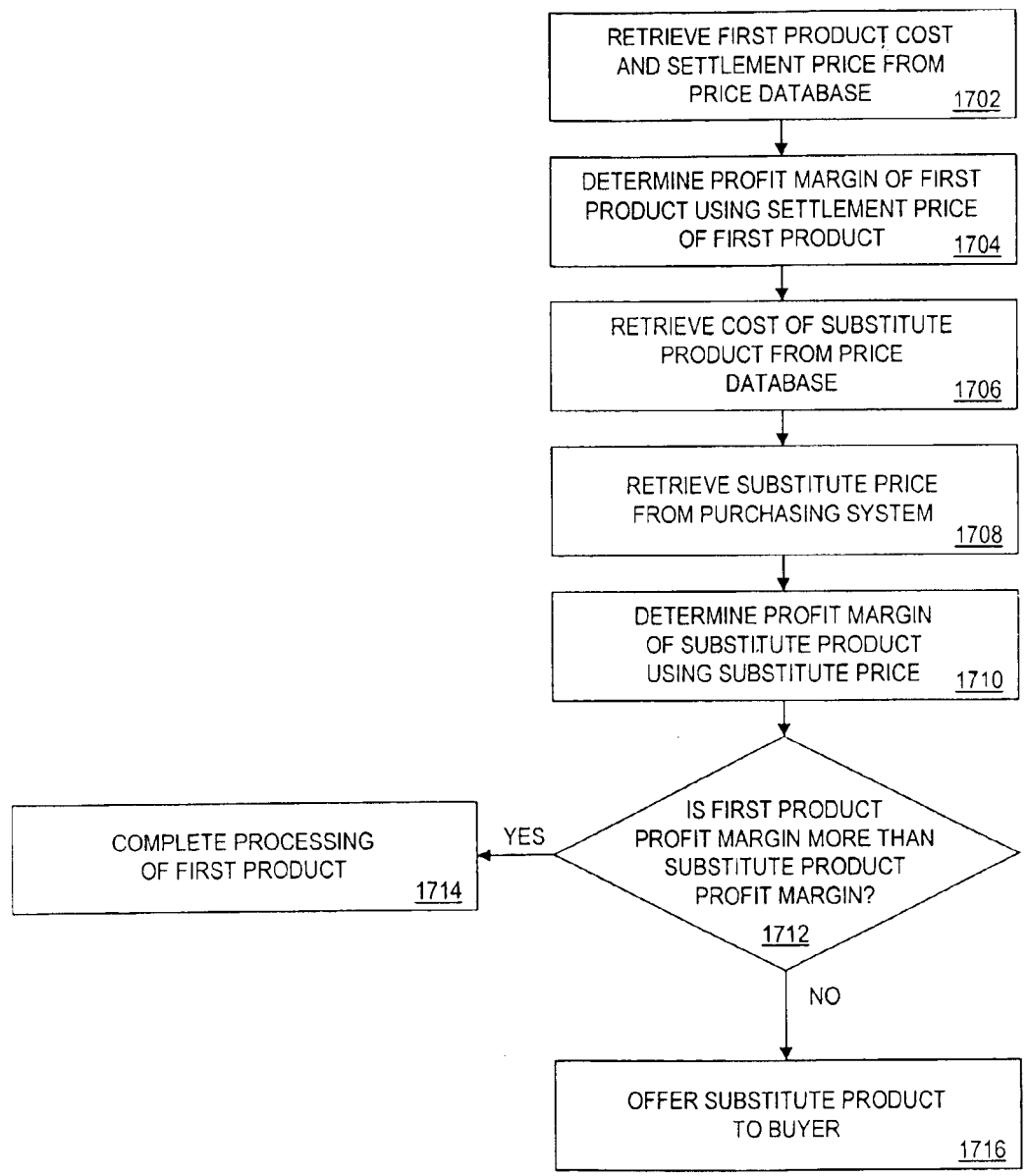
FIG. 17 is a flow chart illustrating a retailer method of comparing a profit margin associated with a first product and a profit margin associated with a substitute product according to an embodiment of the present invention.

FIG. 17 is a flow chart illustrating a method of comparing a profit margin associated with a first product and a profit margin associated with a substitute product as performed by a retailer when determining whether to offer a substitute product to a buyer according to one embodiment of the present invention. At 1702, the cost of the first product and a settlement price associated with the first product are retrieved from the price database 700. The profit margin on the first product is then determined at 1704 (e.g., the settlement price of the first product less the cost of the first product). At 1706, the cost of the substitute product is retrieved from the price database 700. A substitute price associated with the substitute product is retrieved from the purchasing system at 1708 (e.g., by requesting and receiving the substitute price from the purchasing system which may perform a method similar to the method described in FIGS. 16A and 16B). Note that the substitute price received from the purchasing system in 1708 may simply comprise the buyer's price if the retailer will be acting as the seller of the substitute product.

Using this information, the profit margin on the substitute product is determined at 1710 (e.g., the substitute price less then the cost of the substitute product). If the profit margin of the substitute product is less than the profit margin of the first product at 1712, the processing of the first product continues at 1714 (i.e., the substitute product is not offered to the buyer). If, on the other hand, the profit margin of the substitute product is at least equal to the profit margin of the first product at 1712, the substitute product is offered to the buyer at 1716.

FIGS. 1 to 17 describe only some of possible embodiments according to the present invention. Several other embodiments will now be briefly described to illustrate various applications of the present invention. These examples are presented only to demonstrate the wide applicability of the present invention. The examples do not constitute a definition of all possible embodiments or all possible applications. Those skilled in the art will understand that there are many more applications of the present invention consistent with the present disclosure. Further, although the following examples are briefly described for clarity, those skilled in the art will understand how to make any changes, if necessary, to the above-described apparatus and methods to accommodate these and other embodiments and applications.

In an attempt to encourage a buyer to accept a substitute product offer, the substitute product may be offered to the buyer at a different price than the buyer price. For example, a product similar to the first product may be reduced in price in order to make the substitution more attractive to the buyer, or the price of the substitute product may be increased if it is of a higher value than the first product. For example, a retailer may offer a buyer a 40" television in exchange for a voucher for a 30" television and twenty extra dollars, the 40" television being the better value for the price. In this case, the retailer may decrease the price and subsidize the difference according to one embodiment of the present invention.

The retailer may wish to consider other inventory management principles when determining a substitute product to offer a customer. For example, the system may determine that the inventory of a certain product is distressed and thus deem it very important to move that product off the shelf In this case the system may generate substitute product offers for the given distressed inventory more often (where applicable) in an attempt to move the distressed inventory.

A kiosk may be set up in the retailer's establishment in order to facilitate substitute product offers. A buyer may scan the purchasing system redemption code into an input device at the kiosk and the appropriate substitute product offers are displayed on the kiosk's display screen. The buyer's acceptance of the offer may also be entered via a user input device on the kiosk. If desired, a new purchasing system voucher and/or redemption code may be provided to the buyer at the kiosk.

Note that if the purchasing system receives a subsidy on the sale of a product to a buyer, the subsidy information may determine whether or not a substitute product will be offered to the buyer. That is, when the purchasing system device 300 compares the profitability of a first product and a substitute product, the amount of the subsidy (if any) for each product may also be considered. The retailer may also take such a subsidy into account, as when a manufacturer will provide a rebate directly to the retailer. Note also that if the retailer determines whether or not a substitute product will be offered, the purchasing system device 300 may send profit information to the retailer device 400 (e.g., an expected profit based on the sale of the first product). The retailer may then only be allowed to provide a substitute product if the purchasing system is assured to receive a profit of at least that amount from the sale of the substitute product provided by the retailer.

Example Embodiments

The following are several examples which illustrate various applications of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment of the present invention, the purchasing system device 300 arranges for the buyer to purchase a first product when a buyer offer is received from the buyer device 200. Based on the buyer offer (such as a price, a first product category and a first product class), the purchasing system device 300 selects a particular first product (such as a product manufacturer and model number) from a plurality of possible first products. In addition to the buyer offer, the purchasing system device 300 may consider other factors when selecting a particular first product, such as, for example: (i) the expected availability of the first product at retailers; (ii) the actual availability of the first product at retailers—which may be done by communicating with the retailer devices 400; (iii) retail prices of the first product at various retailers—which again may be done by communicating with the retailer devices 400; (iv) subsidy information associated with the first product; and (v) retailer settlement prices associated with the plurality of possible retailers.

By way of example, consider a buyer who sends the purchasing system device 300 an offer to purchase a 35 millimeter (mm) camera for $150. The purchasing system device 300 and/or the seller devices 550 may determine that cameras produced by two different manufacturers can be used to fulfill the buyer's offer. Both cameras are available at a retailer for the same settlement price of $175. One of the manufacturers, however, has agreed to provide a $35 manufacturer subsidy for each camera sold. In this case, the purchasing system device 300 may select the camera produced by that manufacturer to accept the buyer's offer and realize a $10 gain (i.e., the buyer's offer price of $150 less the retailer's settlement price of $175 plus the manufacturer subsidy of $35).

The purchasing system device 300 may likewise select one or more retailers from a plurality of possible retailers. In this case, the purchasing system device 300 may consider, for example: (i) the location of the buyer; (ii) the location of the retailers; (ii) the expected availability of the first product at various retailers; (iii) the actual availability of the first product at various retailers; (iv) retail prices of the first product at various retailers; (iv) retailer subsidy information; and (v) retailer settlement prices.

To determine if and how the buyer offer will be accepted (e.g., which product at which retailer), the purchasing system device 300 may compare the offer price with one or more settlement prices associated with a first product that successfully meets the buyer's offer information. A potential seller may also have a minimum acceptable price, which is the lowest price at which the seller (as opposed to the retailer) will sell the first product (e.g., to prevent brand name dilution). In making this comparison, the purchasing system device 300 may also take into account supplemental price information, such as a manufacturer subsidy amount, a retailer subsidy amount, a purchasing system subsidy amount, or a "third-party subsidy amount" associated with the first product. As used herein, a "third-party subsidy amount" may be, for example, an amount that a third-party agrees to provide in exchange for a promise regarding, an action by, or information about the buyer. That is, the third-party subsidy amount may be applied to the purchase of the first product by the buyer or may be used for any other purpose by the purchasing system.

The purchasing system device 300 also arranges for the buyer to take possession of the first product at a retailer. This may be done, for example, by sending to the buyer redemption information, including a redemption code.

The redemption information can also include a condition that must be met by the buyer, such as a geographic limitation (e.g., the buyer must take possession of the first product, or the substitute product, in Connecticut) or an expiration date. Penalty information, such as a 10% increase in the price of the first product, may also be included in the event the buyer violates a condition associated with the sale. The redemption information can also enable the creation of a coupon-like voucher. For example, the redemption information may let the buyer print a voucher that can be presented to the retailer when taking possession of the first product.

Note that the redemption information may include information associated with a number of first products, as well as a number of retailers. For example, a single voucher might indicate that the buyer can take possession of a VCR at any of three local retailers. In this case, the voucher may be redeemable for one of several different first products, depending on the retailer at which the buyer takes possession of the first product. Accordingly, the redemption information (e.g., a voucher), may include several different Stock Keeping Unit (SKU) numbers, model names and/or model numbers. According to another embodiment, the voucher may include several different first products (e.g., a television or a VCR) or several equivalent first products (e.g., several different television brands, more than one of which may be available at a single retailer).

According to the present invention, a different or "substitute" product is offered to the buyer instead of the first product. For example, the retailer at which the buyer attempts to take possession of the first product may offer a substitute product to the buyer. That is, although the buyer arranged through the purchasing system device 300 to purchase the first product, the buyer is given the opportunity to actually take possession of the substitute product at the retailer, as will be explained.

According to one embodiment of the present invention, the purchasing system device 300 does not guarantee that a retailer will have the first product in stock when the buyer visits the retailer to take possession of the first product. Thus, the buyer may bring a valid purchasing system redemption code to a retailer but still be unable to take possession of the first product. One embodiment of the present invention gives the retailer an opportunity to provide the buyer with a substitute product in exchange for the purchasing system redemption code.

In this case, using the redemption code presented by the buyer, the retailer may, for example, identify: (i) the first product the buyer arranged to purchase through the purchasing system device 300; and (2) the price the buyer agreed to pay for the first product (e.g., a buyer-defined offer price). Using this information, the retailer can search the available inventory for a different product that may be an acceptable substitute for the first product. According to one embodiment of the present invention, the purchasing system does not inform the retailer of the price the buyer agreed to pay for the first product. In this case, the retailer may determine one or more substitute products based on, for example, the settlement price of the first product.

If such a substitute product is found, the retailer may offer that product to the buyer in exchange for the redemption code the buyer originally received. According to another embodiment of the present invention, the original redemption code is canceled and the buyer is issued a new redemption code associated with the substitute product.

If the buyer accepts the substitute product, the buyer may receive the substitute product for the same price originally agreed upon for the first product. According to another embodiment of the present invention, the buyer may purchase the substitute product for an adjusted price that is less than or more than the original buyer price.

The retailer may collect the redemption code from the buyer and notify the purchasing system that the first product has been replaced with a substitute product. The purchasing system can then store an indication that the redemption code has been redeemed for the substitute product, charge the buyer's credit card an amount (which may have been previously frozen), and settle with the retailer.

For example, consider a buyer who reserves a price through the purchasing system device 300 for a 32 inch screen color television that is cable-ready. A first manufacturer agrees to sell the buyer a specific television model number that matches the buyer's requirements for a price defined by the buyer. The purchasing system device 300 arranges for the buyer to purchase the television from the manufacturer, and directs the buyer to a nearby retailer to take possession of the specific television model number. The buyer prints out a purchasing system voucher, and brings the voucher to the local retailer. The local retailer, however, does not currently have that television model in stock.

In this case, an employee of the retailer may scan a bar code printed on the buyer's voucher. The retailer device 400 can use the information from the voucher to determine if any other televisions are in stock that are a suitable substitute for the original television. For example, the retailer may require that a substitute television is associated with a price approximately equal to the price the buyer originally agreed to provide for the television (this information may be, according to one embodiment of the present invention, also include in a bar code on the purchasing system voucher). The search identifies a substitute television, and the retailer offers to provide the buyer the substitute television in exchange for the voucher. The customer, cager to avoid traveling to another retailer, agrees to the substitution, and the retailer notifies the purchasing system. In this way, the purchasing system may provide the retailer an amount associated with the price the buyer agreed to pay for the television (and not the settlement price of either the first television or the substitute television). The amount provided to the retailer can be reduced by a commission amount charged by the purchasing system when a substitution is made, if desired.

According to one embodiment of the present invention, a database stores product identifiers along with a list of appropriate substitute products (as described in detail with respect to FIG. 5). In this case, the identifier associated with the first product may be used to determine one or more substitute products that may be provided to the buyer. This data base of substitute products may be stored in, for example: (i) the purchasing system device 300; (ii) the retailer device 400; or (iii) the seller device 550.

Note that either the retailer, the seller or the purchasing system may determine a substitute product to provide to the buyer. When the retailer determines a substitute product, for example, the retailer may first need to receive permission from the purchasing system. Moreover, the retailer may require more information than is provided on the voucher to make the determination (e.g., the buyer price, the product class or the product features). In this case, the retailer may request the additional information from the purchasing system.

In an embodiment in which the purchasing system determines a substitute product, for example, the retailer may send to the purchasing system a request for a substitute product. In this case, the purchasing system may simply respond with one or more product identifiers associated with acceptable substitute products. When the seller determines a substitute product, it may do so in response to a request from either the retailer or the purchasing system. In this case, the seller may respond with one or more product identifiers associated with acceptable substitute products. According to another embodiment of the present invention, the purchasing system may determine substitute products without receiving a request from a retailer (e.g., substitute products may be determined and stored at the time a buyer offer is accepted).

Regardless of the party performing the determination (e.g., the purchasing system or the retailer), any number of factors may be considered to determine an appropriate substitute product. Some of these factors will now be described.

According to one embodiment of the present invention, the retailer determines a substitute product using a product identifier (e.g., a model number) associated with the first product and price the buyer agreed to pay for the first product (e.g., the buyer-defined offer price). For example, a redemption code printed on the voucher may be associated with a database record in a transaction database (described in detail with respect to FIG. 8). The transaction database may be maintained at the purchasing system and accessed by the retailer (such as by sending a request to the purchasing system) through a communication network, or may be maintained at the retailer and periodically updated by the purchasing system. The transaction database contains information relating to the offer submitted by the buyer to the purchasing system (referred to herein as "buyer offer information"), including the product identifier associated with the first product and the buyer price. The retailer identifies the record of the buyer's transaction and retrieves the product identifier and the buyer?s price.

According to another embodiment of the present invention, the purchasing system does not maintain a transaction database, but instead the information is printed or encoded directly on the voucher. For example, the first product's product identifier, the buyer's price, the retail price and/or the name of the first product may be printed on the voucher. Some or all of this information may be encoded in the form of a bar code instead of, or in addition to, being printed in human readable form. Note that according to still another embodiment of the present invention, such information is both stored in a database and printed on a purchasing system voucher.

The retailer may use the first product's product identifier to search an inventory database 600 (described with respect to FIG. 6) that associates the product identifier with an amount of inventory. According to one embodiment of the present invention, the retailer will only determine a substitute product if the first product is not currently in stock. According to another embodiment of the present invention, the retailer may always attempt to determine a substitute product, if desired.

Note also that another party may request that a substitute product be determined. For example, the buyer may see a different product at the retailer and ask if that product may be used as a substitute product. Such a request may be made, for example, using a buyer input device (such as a kiosk) located at the retailer. Consider a buyer that visits a retailer to take possession of a 21 inch screen television purchased through the purchasing system. The buyer may see a substitute product, such as a 25 inch screen television or even a completely unrelated product, and request (e.g., by providing a request to the retailer or purchasing system) to be allowed to take possession of the substitute product instead of the 21 inch screen television. According to one embodiment of the present invention, the buyer may also provide a payment for the substitute product that is different than (i.e., more or less than) the payment the buyer agreed to pay in exchange for the 21 inch screen television.

The retailer device 400 can use the first product's product identifier to query a product database 500 (described in detail with respect to FIG. 5) in an attempt to identify an acceptable substitute product. The product database 500 contains information relating to products the retailer normally keeps in inventory. In one embodiment, a list of product identifiers associated with acceptable substitute products are stored in the product database 500. In an embodiment where one or more product identifiers are stored in a database along with appropriate substitute product identifiers, such a database may be stored, for example, at the retailer, the purchasing system or the seller.

The determination of a substitute product may also be based, for example, on an exact match between the type, class and features of the first product (or buyer offer) and those of the substitute product. The determination may instead be based on a partial match, such as by matching three out of four features.

If a potential substitute product is found and the purchasing system is making the determination of the substitute product, the purchasing system may determine if that product will be offered to the buyer. In this case, the purchasing system may compare the buyer price to a minimum acceptable price the seller will accept for the substitute product. The minimum acceptable price for a substitute product may, for example, be predetermined and stored in the product database 500. If the minimum acceptable price of the substitute product is less than or equal to the buyer price, the substitute product may be provided to (or offered to) the buyer.

No matter which entity (e.g., the retailer, the seller, or the purchasing system) is making the determination of an acceptable substitute product, a verification of the substitute product's current availability at the retailer may be performed before the substitute product is offered to the buyer, according to one embodiment of the present invention. For example, the retailer can search the inventory database 600 to determine if the substitute product is currently in stock. If the substitute product is in stock, the retailer can offer that substitute product to the buyer in exchange for the redemption code on the purchasing system voucher. According to one embodiment of the present invention, a substitute product may only be provided to the buyer when the buyer agrees to the substitution. According to another embodiment, the buyer may have to accept any substitute product that meets the buyer's original requirements.

When a substitute product is provided to a buyer, the retailer can update the record in the transaction database 800 associated with the buyer's transaction. The purchasing system may also be notified, for example, so that the retailer will be reimbursed an amount based the buyer's price (instead of the settlement price of the first product). The retailer may enter the product identifier of the substitute product into the transaction database 800 and indicate that the substitute product was provided in place of the first product. The retailer may also change the status of the transaction to "switched" and store the retailer's identifier to identify itself as the new seller. In another embodiment, the retailer forwards the appropriate information to the purchasing system, which in turn updates the appropriate records. The purchasing system may periodically print reports of all consummated transactions and settle with the appropriate parties as necessary. In this case, the settlement report may indicate that the retailer provided the buyer with a substitute product, and is therefore entitled to be reimbursed an amount based on the buyer price.

In this way, the retailer may be allowed to keep the buyer's business, even when the retailer does not have the first product the buyer arranged to purchase. The retailer may also make use of information obtained when a redemption code is presented, such as: an indication the buyer is ready to purchase an item; a description of the kind of product the buyer wants to purchase; and an estimation of what the buyer will agree to pay for such a product. In addition, the retailer may utilize an embodiment of the present invention to selectively move distressed inventory in a profitable manner. Moreover, the retailer may, according to an embodiment of the present invention, sell the buyer a substitute product associated with a margin higher than the first product.

According to another embodiment of the present invention, the seller of the first product may make a counteroffer associated with a substitute product. Consider, for example, a buyer that arranges to purchase a 21 inch television from a first manufacturer through the purchasing system. If retailer attempts to substitute a 25 inch television made by a second manufacturer, the first manufacturer may present its own offer of a 25 inch television to the buyer.

According to another embodiment of the present invention, a buyer that arranged to purchase a first product through the purchasing system may visit all retailers listed on a purchasing system voucher. If none of the retailers have the first product available, the may contact the purchasing system (e.g., by returning home and accessing a Web site associated with the purchasing system) and requests a substitute product. The purchasing system may verify that the product is not available at all of the retailers listed on the voucher and, if the product is not available, determine a substitute product for the buyer. According to an embodiment of the present invention, the purchasing system may also provide the buyer with compensation (e.g., a discount, a more valuable first product or a supplemental offer) in this situation.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a retailer system, comprising:
  receiving product redemption information, the product redemption information enabling a buyer to take possession of a first product, purchased by the buyer through a purchasing system, at a retailer, wherein
    the buyer takes possession of the first product at a retailer that is a different entity from the purchasing system,
    the buyer had purchased the first product through the purchasing system by establishing with the purchasing system a first price for the product,
    the retailer offers, to buyers who do not purchase the first product through the purchasing system, the first product for sale at a second price that is different than the first price, and
    the buyer provides a payment, based on the first price, to the purchasing system; and
  determining, by a computing device, a substitute product to provide to the buyer, the substitute product being different than the first product.

2. The method of claim 1, further comprising:
  providing the substitute product to the buyer.

3. The method of claim 1, wherein said determination of the substitute product is based at least in part on the product redemption information.

4. The method of claim 1, wherein said determination of the substitute product is based at least in part on the first product.

5. The method of claim 1, wherein said determination of the substitute product is based at least in part on a comparison of an identifier associated with the first product and a set of identifiers associated with acceptable substitute products.

6. The method of claim 5, wherein said determination of the substitute product is further based at least in part on: (i) a Universal Product Code associated with the first product; (ii) a Stock Keeping Unit number associated with the first product; and (iii) a manufacturer associated with the first product.

7. The method of claim 1, wherein said determination of the substitute product is based at least in part on a settlement price the retailer has agreed to accept in exchange for providing to the buyer one of: (i) the first product; and (ii) the substitute product.

8. The method of claim 1, wherein said determination of the substitute product is based at least in part on a price the buyer has agreed to provide to the purchasing system in exchange for the right to take possession of the first product at the retailer.

9. The method of claim 1, wherein said determination of the substitute product is based at least in part on inventory information associated with at least one of: (i) the first product; and (ii) the substitute product.

10. The method of claim 1, wherein said determination of the substitute product is based at least in part on sales history information associated with at least one of: (i) the first product; and (ii) the substitute product.

11. The method of claim 1, wherein said determination of the substitute product is based at least in part on, with respect to the first product, at least one of: (i) an actual or forecast product demand; (ii) a product age or perishability; (iii) a product life cycle; (iv) information about a competing product; and (v) an actual or forecast profitability of the product.

12. The method of claim 1, wherein said determination of the substitute product is based at least in part on, with respect to the substitute product, at least one of: (i) an actual or forecast product demand; (ii) a product age or perishability; (iii) a product life cycle; and (iv) an actual or forecast profitability of the product.

13. The method of claim 1, wherein said determination of the substitute product is based at least in part on a comparison of: (i) a settlement price associated with the first product less the cost of the first product to the retailer; and (ii) a settlement price associated with the substitute product less the cost of the substitute product to the retailer.

14. The method of claim 1, wherein the buyer the arranged to purchase the first product through a purchasing system by submitting a buyer offer, and wherein said determination of the substitute product is based at least in part on said buyer offer.

15. The method of claim 14, wherein the buyer offer comprises at least one of: (i) a buyer-defined price; (ii) a product category; (iii) a product class; and (iv) a product features.

16. The method of claim 1, wherein said determination of the substitute product comprises:
comparing a set of features associated with a buyer offer with a set of features associated with the substitute product, wherein the substitute product may be selected if a predetermined number of matches are found by said comparison.

17. The method of claim 1, wherein said determination of the substitute product comprises:
presenting a group of substitute product choices, the group containing at least one substitute product choice, to the buyer; and
receiving from the buyer a selection from the group.

18. The method of claim 1, further comprising:
determining if the first product is available to be provided to the buyer,
wherein said determination of the substitute product is only performed if the first product is not available.

19. The method of claim 1, wherein said determination of the substitute product comprises:
receiving substitute product information from the purchasing system.

20. The method of claim 1, wherein said determination of the substitute product comprises:
locally determining the substitute product at the retailer system.

21. The method of claim 1, further comprising:
sending information about the substitute product to the purchasing system.

22. The method of claim 21, further comprising:
receiving from the purchasing system verification information enabling the retailer to authorize the buyer to take possession of the substitute product.

23. The method of claim 1, further comprising:
sending to the purchasing system a request to offer the substitute product to the buyer; and
receiving from the purchasing system information approving the request to offer the substitute product to the buyer.

24. The method of claim 1, further comprising:
receiving payment of an additional amount in exchange for providing the substitute product to the buyer, the payment of the additional amount being received from at least one of: (i) the buyer; (ii) the purchasing system; and (iii) a manufacturer of the product.

25. The method of claim 1, further comprising:
receiving from the purchasing system payment of a settlement amount in exchange for providing the substitute product to the buyer, the settlement amount being an amount the retailer has agreed to accept in exchange for providing to the buyer one of: (i) the first product; and (ii) the substitute product.

26. The method of claim 1, further comprising:
receiving from the purchasing system payment of an amount, associated with the price paid by the buyer to the purchasing system, in exchange for providing the substitute product to the buyer.

27. The method of claim 1, further comprising:
providing credit of a difference amount in exchange for providing the substitute product, the credit of the difference amount being provided to at least one of: (i) the buyer; (ii) the purchasing system; and (iii) a manufacturer of the product.

28. The method of claim 27, wherein the difference amount is based at least in part on the difference between a price the buyer agrees to provide for the first product and a price the buyer agrees to provide for the substitute product.

29. The method of claim 1, wherein the buyer arranged through a communication network to purchase the first product from a first seller at a first price.

30. The method of claim 29, wherein the first seller is the retailer, and the retailer arranges to provide the substitute product to the buyer for the first price.

31. The method of claim 29, wherein the first seller is a party other than the retailer, and the retailer arranges to provide the substitute product to the buyer for a settlement price associated with at least one of: (i) the first product; and (ii) the substitute product.

32. The method of claim 31, wherein the retailer sells the substitute product to the buyer.

33. The method of claim 31, wherein the first seller sells the substitute product to the buyer.

34. The method of claim 31, wherein a second seller, different than the first seller, sells the substitute product to the buyer.

35. The method of claim 31, wherein the buyer agrees to purchase the substitute product for a second price.

36. The method of claim 35, wherein the second price is less than the first price.

37. The method of claim 35, wherein the second price is greater than the first price.

38. The method of claim 1, further comprising:
receiving from the purchasing system verification information enabling the retailer to authorize the buyer to take possession of the substitute product.

39. The method of claim 38, wherein said receiving verification information comprises:
receiving a one way hash function such that the retailer can determine, using the one way hash function, if redemption information possessed by the buyer authorizes the buyer to take possession of either (i) the first product; and (ii) the substitute product.

40. The method of claim 38, wherein said receiving verification information comprises:
sending to the purchasing system information about an attempt to take possession of the substitute product; and
receiving from the purchasing system verification information authorizing the buyer to take possession of one of: (i) the first product; and (ii) the substitute product.

41. The method of claim 38, wherein said receiving verification information comprises:
receiving from the purchasing system verification information authorizing a plurality of buyers to take possession of a plurality of products or a plurality of substitute products.

42. The method of claim 1, wherein the retailer system provides a payment to the purchasing system such that amount of profit made by the purchasing system is the same as it would have been had the retailer provided the first product to the buyer instead of the substitute product.

43. The method of claim 1, wherein the retailer receives information from the purchasing system associated with an amount of profit that will be made by the purchasing system if the retailer provides to the buyer one of: (i) the first product; and (ii) the substitute product.

44. The method of claim 1, further comprising:
receiving from the buyer a request for a substitute product.

45. A method of operating a retailer system, comprising:
receiving product redemption information from a buyer, the product redemption information enabling the buyer to take possession of a first product, purchased by the buyer through a purchasing system, at a retailer that is a different entity from the purchasing system, wherein
the buyer had purchased the first product through the purchasing system by establishing with the purchasing system a first price for the product,
the retailer offers, to buyers who do not purchase the first product through the purchasing system, the first product for sale at a second price that is different than the first price, and
the buyer provides a payment, based on the first price, to the purchasing system;
determining if the first product is available to be provided to the buyer,
determining a substitute product to provide to the buyer, the substitute product being different than the first product;
sending to the purchasing system information about an attempt to provide the substitute product to the buyer;
receiving from the purchasing system verification information enabling the retailer to authorize the buyer to take possession of the substitute product; and
providing the substitute product to the buyer.

46. The method of claim 45, wherein said determination of a substitute product is based at least in part on a buyer offer provided from the buyer to the purchasing system.

47. A method of operating a purchasing system, comprising:
arranging through a communication network for a buyer to purchase a first product from a seller;
sending product redemption information to the buyer, the product redemption information enabling the buyer to take possession of the first product at a retailer that is a different entity from the seller, wherein
the buyer had purchased the first product from the seller by establishing with the purchasing system a first price for the product,
the retailer offers, to buyers who do not purchase the first product from the seller, the first product for sale at a second price that is different than the first price, and
the buyer provides a payment, based on the first price, to the seller;
receiving from the retailer information related to an attempt to provide a substitute product to the buyer; and
sending to the retailer verification information enabling the retailer to authorize the buyer to take possession of the substitute product.

48. The method of claim 47, further comprising:
voiding the product redemption information associated with the first product.

49. The method of claim 47, further comprising:
determining an amount to be provided to the retailer in exchange for providing the substitute product to the buyer, the amount being different than settlement amounts associated with the first product and the substitute product.

50. The method of claim 47, wherein the amount provided to the retailer is an amount based on a price the buyer agreed to provide in exchange for one of: (i) the first product; and (ii) the substitute product.

51. The method of claim 47, wherein the product redemption information further comprises substitution condition information.

52. The method of claim 47, wherein the product redemption information further comprises substitution penalty information.

53. The method of claim 47, further comprising the step of:
updating a purchasing system database to indicate that the buyer has taken possession of the substitute product instead of the first product at the retailer.

54. The method of claim 47, further comprising:
receiving payment in exchange for allowing the retailer to provide a substitute product to the buyer, the payment being received from at least one of: (i) the retailer; (ii) the buyer; (iii) a seller of the substitute product; (iv) a manufacturer of the substitute product; and (v) a third party.

55. A method of operating a purchasing system, comprising:

arranging through a communication network for a buyer to purchase a first product from a seller;

sending product redemption information to the buyer, the product redemption information enabling the buyer to take possession of the first product at a retailer that is a different entity from the seller, wherein the buyer had purchased the first product from the seller by establishing with the seller a first price for the product, the retailer offers, to buyers who do not purchase the first product from the seller, the first product for sale at a second price that is different than the first price, and the buyer provides a payment, based on the first price, to the seller;

receiving from the retailer a request to offer a substitute product to the buyer;

determining if the retailer request will be approved; and sending to the retailer information approving the request to offer the substitute product to the buyer.

56. The method of claim 55, wherein said determination is based at least in part on: (i) an amount of profit to be made by the purchasing system if the request is approved; and (ii) an amount of profit to be made by the purchasing system if the request is not approved.

57. The method of claim 55, wherein said determination is based at least in part on a comparison between: (i) a price the buyer agreed to pay for the first product less a settlement price associated with the first product plus a first product subsidy amount; and (ii) a price the buyer agreed to pay for the first product less a settlement price associated with the substitute product plus a substitute product subsidy amount.

58. The method of claim 55, wherein said determination is based at least in part on a comparison of an identifier associated with the first product and a set of identifiers associated with acceptable substitute products.

59. The method of claim 55, wherein said determination is based at least in part on the first product.

60. The method of claim 55, wherein said determination is further based at least in part on: (i) a Universal Product Code associated with the first product; (ii) a Stock Keeping Unit number associated with the first product; and (iii) a manufacturer associated with the first product.

61. The method of claim 55, wherein said determination is based at least in part on a price the buyer has agreed to provide to the purchasing system in exchange for the right to take possession of the first product at the retailer.

62. The method of claim 55, wherein said determination is based at least in part on inventory information associated with at least one of: (i) the first product; and (ii) the substitute product.

63. The method of claim 55, wherein said determination is based at least in part on sales history information associated with at least one of: (i) the first product; and (ii) the substitute product.

64. The method of claim 55, wherein said determination is based at least in part on, with respect to the first product, at least one of: (i) an actual or forecast product demand; (ii) a product age or perishability; (iii) a product life cycle; (iv) information about a competing product; and (v) an actual or forecast profitability of the product.

65. The method of claim 55, wherein said determination is based at least in part on, with respect to the substitute product, at least one of: (i) an actual or forecast product demand; (ii) a product age or perishability; (iii) a product life cycle; and (iv) an actual or forecast profitability of the product.

66. The method of claim 55, wherein the buyer the arranged to purchase the first product through a purchasing system by submitting a buyer offer, and wherein said determination is based at least in part on said buyer offer.

67. The method of claim 55, wherein the buyer offer comprises at least one of: (i) a buyer-defined price; (ii) a product category; (iii) a product class; and (iv) a product features.

68. A method of operating a purchasing system, comprising:

arranging through a communication network for a buyer to purchase a first product from a seller;

sending product redemption information to the buyer, the product redemption information enabling the buyer to take possession of the first product at a retailer that is a different entity from the seller, wherein the buyer had purchased the first product from the seller by establishing with the purchasing system a first price for the product, the retailer offers, to buyers who do not purchase the first product from the seller, the first product for sale at a second price that is different than the first price, and the buyer provides a payment, based on the first price, to the seller;

receiving a request to identify a substitute product;

determining a substitute product to provide to the buyer; and sending to the retailer information about the substitute product.

69. The method of claim 68, wherein said determination is based at least in part on: (i) an amount of profit to be made by the purchasing system if the request is approved; and (ii) an amount of profit to be made by the purchasing system if the request is not approved.

70. The method of claim 68, wherein said determination is based at least in part on a comparison between: (i) a price the buyer agreed to pay for the first product less a settlement price associated with the first product plus a first product subsidy amount; and (ii) a price the buyer agreed to pay for the first product less a settlement price associated with the substitute product plus a substitute product subsidy amount.

71. The method of claim 68, wherein said determination is based at least in part on a comparison of an identifier associated with the first product and a set of identifiers associated with acceptable substitute products.

72. The method of claim 68, wherein said determination is based at least in part on the first product.

73. The method of claim 68, wherein said determination is further based at least in part on: (i) a Universal Product Code associated with the first product; (ii) a Stock Keeping Unit number associated with the first product; and (iii) a manufacturer associated with the first product.

74. The method of claim 68, wherein said determination is based at least in part on a price the buyer has agreed to provide to the purchasing system in exchange for the right to take possession of the first product at the retailer.

75. The method of claim 68, wherein said determination is based at least in part on inventory information associated with at least one of: (i) the first product; and (ii) the substitute product.

76. The method of claim 68, wherein said determination is based at least in part on sales history information associated with at least one of: (i) the first product; and (ii) the substitute product.

77. The method of claim 68, wherein said determination is based at least in part on, with respect to the first product, at least one of: (i) an actual or forecast product demand; (ii) a product age or perishability; (iii) a product life cycle; (iv) information about a competing product; and (v) an actual or forecast profitability of the product.

78. The method of claim 68, wherein said determination is based at least in part on, with respect to the substitute product, at least one of: (i) an actual or forecast product demand; (ii) a product age or perishability; (iii) a product life cycle; and (iv) an actual or forecast profitability of the product.

79. The method of claim 68, wherein the buyer the arranged to purchase the first product through a purchasing system by submitting a buyer offer, and wherein said determination is based at least in part on said buyer offer.

80. The method of claim 68, wherein the buyer offer comprises at least one of: (i) a buyer-defined price; (ii) a product category; (iii) a product class; and (iv) a product features.

81. A method of operating a purchasing system, comprising:
    arranging through a communication network for a buyer to purchase one of a plurality of products from a seller;
    sending product redemption information to the buyer, the product redemption information enabling the buyer to take possession of one of the plurality of products at a retailer that is a different entity from the seller, wherein
        the buyer had purchased the first product from the seller by establishing with the seller a first price for the product,
        the retailer offers, to buyers who do not purchase the first product from the seller, the first product for sale at a second price that is different than the first price, and
    the buyer provides a payment, based on the first price, to the seller;
    receiving from the retailer information related to an attempt to provide to the buyer a particular product of the plurality of products; and
    sending to the retailer verification information enabling the retailer to authorize the buyer to take possession of the particular product.

82. A method of operating a purchasing system, comprising:
    arranging through a communication network for a buyer to purchase a type of product from a seller;
    sending product redemption information to the buyer, the product redemption information enabling the buyer to take possession of the type of product at a retailer that is a different entity from the seller, wherein
        the buyer had purchased the first product from the seller by establishing with the seller a first price for the product,
        the retailer offers, to buyers who do not purchase the first product from the seller, the first product for sale at a second price that is different than the first price, and
    the buyer provides a payment, based on the first price, to the seller;
    receiving from the retailer information related to an attempt to provide to the buyer a particular product; and
    sending to the retailer verification information authorizing the buyer to take possession of the particular product.

83. A method of operating a purchasing system, comprising:
    receiving a buyer offer through a communication network, including a buyer-defined price and product requirements, from the buyer;
    determining if the buyer offer will be accepted by a seller;
    sending product redemption information to the buyer, the product redemption information enabling the buyer to take possession of a product in accordance with the product requirements, wherein
        the buyer takes possession of the product at a retailer that is a different entity from the seller,
        the buyer had purchased the first product from the seller by establishing with the seller a first price for the product,
        the retailer offers, to buyers who do not purchase the first product from the seller, the first product for sale at a second price that is different than the first price, and
    the buyer provides a payment, based on the first price, to the seller;
    receiving from the retailer information related to an attempt to provide a product to the buyer; and
    sending to the retailer verification information authorizing the buyer to take possession of the product.

84. The method of claim 83, wherein the product requirements comprises at least one of: (i) a product class; (ii) a product category; and (iii) a product feature.

85. A retailer system device, comprising:
    a processor; and
    a storage device coupled to said processor and storing instructions adapted to be executed by said processor to:
    receive product redemption information from a buyer, the product redemption information enabling the buyer to take possession of a first product, purchased by the buyer through a purchasing system, at a retailer that is a different entity from the purchasing system, wherein
        the buyer had purchased the first product through the purchasing system by establishing with the purchasing system a first price for the product,
        the retailer offers, to buyers who do not purchase the first product through the purchasing system, the first product for sale at a second price that is different than the first price, and
        the buyer provides a payment, based on the first price, to the purchasing system; and
    determine a substitute product to provide to the buyer, the substitute product being different than the first product.

86. A retailer system apparatus, comprising:
    means for receiving product redemption information from a buyer, the product redemption information enabling the buyer to take possession of a first product, purchased by the buyer through a purchasing system, at a retailer that is a different entity from the purchasing system, wherein
        the buyer had purchased the first product through the purchasing system by establishing with the purchasing system a first price for the product,
        the retailer offers, to buyers who do not purchase the first product through the purchasing system, the first product for sale at a second price that is different than the first price, and
    the buyer provides a payment, based on the first price, to the purchasing system; and means for determining a substitute product to provide to the buyer, the substitute product being different than the first product.

87. A medium storing instructions adapted to be executed by a processor to perform a method for operating a retailer system, said method comprising:

receiving product redemption information from a buyer, the product redemption information enabling the buyer to take possession of a first product, purchased by the buyer through a purchasing system, at a retailer that is a different entity from the purchasing system, wherein the buyer had purchased the first product through the purchasing system by establishing with the purchasing system a first price for the product, the retailer offers, to buyers who do not purchase the first product through the purchasing system, the first product for sale at a second price that is different than the first price, and the buyer provides a payment, based on the first price, to the purchasing system; and determining a substitute product to provide to the buyer, the substitute product being different than the first product.

88. A method of using a purchasing system, comprising:

arranging through a communication network to purchase a first product from a seller;

receiving product redemption information, the product redemption information enabling a buyer to take possession of the first product at a retailer that is a different entity from the seller, wherein the first product had been purchased from the seller by establishing with the seller a first price for the product, the retailer offers, to buyers who do not purchase the first product from the seller, the first product for sale at a second price that is different than the first price, and a payment, based on the first price, is provided to the seller;

providing the product redemption information to the retailer; and taking possession of a substitute product at the retailer.

89. A method of using a purchasing system, comprising:

arranging through a communication network to purchase a first product from a seller;

receiving product redemption information, the product redemption information enabling a buyer to take possession of the first product at a retailer that is a different entity from the seller, wherein the first product is purchased from the seller by establishing with the seller a first price for the product, the retailer offers, to buyers who do not purchase the first product from the seller, the first product for sale at a second price that is different than the first price, and a payment, based on the first price, is provided to the seller;

providing a request to take possession of a substitute product; and taking possession of the substitute product at the retailer.

* * * * *